United States Patent
Matsuyama et al.

(10) Patent No.: US 8,523,992 B2
(45) Date of Patent: Sep. 3, 2013

(54) MAGENTA RECORDING INK COMPOSITION, INKJET RECORDING METHOD, AND INK RECORDED MATTER

(75) Inventors: Akihiko Matsuyama, Kanagawa (JP); Yuji Natori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 127 days.

(21) Appl. No.: 12/811,271

(22) PCT Filed: Jan. 20, 2009

(86) PCT No.: PCT/JP2009/051141
§ 371 (c)(1),
(2), (4) Date: Jun. 30, 2010

(87) PCT Pub. No.: WO2009/093721
PCT Pub. Date: Jul. 30, 2009

(65) Prior Publication Data
US 2010/0285287 A1    Nov. 11, 2010

(30) Foreign Application Priority Data
Jan. 22, 2008    (JP) .................................. 2008-011161

(51) Int. Cl.
*C09D 11/02*    (2006.01)
(52) U.S. Cl.
USPC ................ 106/31.6; 106/31.86; 106/31.65; 106/31.89
(58) Field of Classification Search
USPC .................... 106/31.6, 31.86, 31.89, 31.65
See application file for complete search history.

(56) References Cited

U.S. PATENT DOCUMENTS

| | | | | |
|---|---|---|---|---|
| 5,846,306 | A | * | 12/1998 | Kubota et al. ............... 106/31.75 |
| 6,245,138 | B1 | * | 6/2001 | Nyssen et al. .............. 106/31.86 |
| 6,379,443 | B1 | * | 4/2002 | Komatsu et al. ........... 106/31.58 |
| 2003/0101905 | A1 | * | 6/2003 | Momose ..................... 106/31.58 |
| 2005/0145140 | A1 | * | 7/2005 | Babler ......................... 106/493 |
| 2007/0117882 | A1 | | 5/2007 | Aoyama et al. |
| 2007/0197685 | A1 | | 8/2007 | Aruga et al. |
| 2007/0266887 | A1 | * | 11/2007 | Koganehira et al. ......... 106/31.6 |
| 2008/0092773 | A1 | | 4/2008 | Matsuyama |

(Continued)

FOREIGN PATENT DOCUMENTS

| | | |
|---|---|---|
| JP | 60 45669 | 10/1985 |
| JP | 9 286167 | 11/1997 |

(Continued)

OTHER PUBLICATIONS

English machine translation of 10-036731.*

(Continued)

*Primary Examiner* — Kaj K Olsen
*Assistant Examiner* — Veronica F Faison
(74) *Attorney, Agent, or Firm* — Oblon, Spivak, McClelland, Maier & Neustadt, L.L.P.

(57) ABSTRACT

The present invention provides a magenta recording ink composition including at least a solid solution pigment (A) containing quinacridone, a lake pigment (B) having a xanthene structure, an aqueous solvent, and water, wherein the solid solution pigment (A) has visible light absorption peaks at wavelength ranges of from 510 nm to 530 nm and from 540 nm to 560 nm, and a mass ratio (B/A) of the lake pigment (B) to the solid solution pigment (A) falls within the range of 0.1 to 5.

15 Claims, 3 Drawing Sheets

(56) References Cited

U.S. PATENT DOCUMENTS

| | | |
|---|---|---|
| 2009/0035468 A1 | 2/2009 | Matsuyama et al. |
| 2009/0117349 A1* | 5/2009 | Saito et al. ................ 428/195.1 |
| 2009/0176070 A1 | 7/2009 | Goto et al. |
| 2009/0186162 A1 | 7/2009 | Namba et al. |

FOREIGN PATENT DOCUMENTS

| | | |
|---|---|---|
| JP | 10 36731 | 2/1998 |
| JP | 11 49998 | 2/1999 |
| JP | 2001 192591 | 7/2001 |
| JP | 2002 235020 | 8/2002 |
| JP | 2002 348493 | 12/2002 |
| JP | 2003 238875 | 8/2003 |
| JP | 2003 292812 | 10/2003 |
| JP | 3670148 | 7/2005 |
| JP | 3829419 | 10/2006 |
| JP | 2007 277354 | 10/2007 |
| JP | 2008 255241 | 10/2008 |

OTHER PUBLICATIONS

English machine translation of 11-049998.*

* cited by examiner

MAGENTA RECORDING INK COMPOSITION, INKJET RECORDING METHOD, AND INK RECORDED MATTER

CROSS-REFERENCE TO RELATED APPLICATIONS

This application is a National Stage of PCT/JP2009/051141 filed Jan. 20, 2009 and claims the benefit of JP 2008-011161 filed Jan. 22, 2008.

TECHNICAL FIELD

The present invention relates to a magenta recording ink composition which is suitably used for inkjet recording, superior in ejection stability, water resistance and light resistance and enables obtaining high-quality images with high-color saturation and excellent color tone, which contains at least a solid solution pigment (A) containing quinacridone, a lake pigment (B) having a xanthene structure, an aqueous solvent, and water, wherein the solid solution pigment (A) has visible light is absorption peaks at wavelength ranges of from 510 nm to 530 nm and from 540 nm to 560 nm, and a mass ratio (B/A) of the lake pigment (B) to the solid solution pigment (A) falls within the range of 0.1 to 5. The present invention also relates to an inkjet recording method and ink recorded matters using the magenta recording ink composition.

BACKGROUND ART

Inkjet printers have become increasingly popular because of such advantages as low-noise pollution and low-running cost, and inkjet color printers capable of printing on plain paper have also been increasingly put on the market. However, it is significantly difficult for inkjet printers to satisfy all the requirements such as color reproducibility of images, abrasion resistance, light resistance, gas resistance, water resistance and drying property of recorded images, resistance to character feathering, resistance to bleed at boundaries between different colors (resistance to color bleed), image density uniformity at solid image parts (resistance to beading), double-sided printing property and ejection stability. Thus, in reality, an ink and a recording medium are selected in view of preferential properties in accordance with the intended use.

In general, inks used in inkjet recording contain water as a main component and additionally contain a colorant, and a wetting agent such as glycerin with a view to preventing clogging. As for colorants, water-soluble dyes which enable obtaining vivid colors are commonly used. Dyes are, however, inferior in resistance to light, gases and water, and images recorded with dyes on plain paper are far from providing satisfactory image quality. To solve the problem, attempts to improve these resistances, i.e., resistance to light, gases and water, are made by improving properties of inkjet recording paper having an ink absorption layer. But, the improvements have not yet reached sufficient levels.

Recently, pigments have become widely used as colorants because of their superior light resistance, gas resistance and water resistance. However, it is true that pigments are inferior in color developing property to dyes. This can be primarily explained by the fact that lights having different wavelengths and/or phases caused by multiple reflection inside pigment particles interfere with each other. That is, when pigment(s) are used as inkjet recording ink(s), a reduction in color saturation occurs on plain paper, and a reduction in glossiness occurs on inkjet recording paper. To solve the problems, attempts are made to improve color saturation by making finer pigment microparticles and to improve glossiness of pigment particles by covering the particles with polymer. Despite these improvements, there still exist a difference in color developing property between pigments and dyes.

Particularly in magenta inks, quinacridone pigments are widely used for their superior color developing properties and light resistance. Quinacridone pigments, however, are somewhat more reddish in color than the standard magenta color (Japan color Ver. 2) used in printing. This tendency has become increasingly marked as an image is printed with higher image density. When an attempt is made to yield a vivid color with high image density, a resultant color inconveniently becomes more reddish. However, at the present time, there are no pigments that can achieve a color comparable to the standard magenta color with high color saturation through the use of one pigment alone. Recently, attempts to obtain high magenta color saturation are made using a to solid solution of quinacridone pigment, but the desired magenta color saturation has not yet been achieved.

Patent Literature 1 and other documents propose an ink using a solid solution pigment. In most cases, use of solid solution pigments makes it possible to obtain vivid is colors as compared with inks which contain pigments composed of monocrystal, however, solid solution pigments are still inferior in color developing property to dyes.

Meanwhile, attempts are made in Patent Literature 2 through Patent Literature 6 to increase color saturation, which has been insufficient with use of one type of dye, by mixing two or more types of water-soluble dye including xanthene dyes, and to improve light resistance, which has been insufficient with use of one type of dye, by mixing dyes having higher light resistance. However, the light resistance of dyes is still insufficient, even if a plurality of dyes are mixed, it is incomparable with the light resistance of pigment inks at the present time.

As an ink that satisfies both excellent light resistance obtained from pigments and excellent brilliant coloring effect obtained from dyes, Patent Literature 7 proposes an ink produced by mixing Rhodamine B-based water-soluble dye and a pigment. With this method, the light resistance can be improved as close as that provided by using a pigment, however, when a penetration-type ink having low-surface tension is printed on plain paper, feathering and color bleed occur as in the case where a dye-based ink is used, resulting in incapability of obtaining an image with high-sharpness.

Also, an ink produced by mixing two or more types of different organic pigments is proposed. Patent Literature 8 proposes to adjust color tone and improve color saturation by adding from 0.01% to 1% of an organic pigment having a hue angle of 270 degrees to 340 degrees to a quinacridone pigment. However, even if such a small amount as 0.01% to 1% of the pigment is added, a change in color tone and a further improvement in color saturation can be little expected. In contrast, when a lake pigment (B) is added to a solid solution pigment (A) at a mass ratio (B/A) within the range of 0.1 to 5, as in the present invention, it is possible to adjust color tone and improve color saturation. Patent Literature 9 proposes an inkjet recording ink produced by mixing a quinacridone pigment and a pigment(s) of red, violet, orange, etc. in color, but the proposal is intended to achieve inks for use in color filters with more transparent and more vivid color. Thus, the object of the proposed ink differs from that of the magenta ink of the present invention.

The present inventors proposed before in Patent Literature 10 a technique relevant to an ink composition containing colored polymer fine particles in which an organic pigment (solid solution pigment), an oil-soluble dye and an inorganic pigment are covered with a polymer, but the ink proposed by the technique differs from an ink according to the present invention in which an organic pigment (specific solid solution pigment) and a lake pigment are mixed.

Patent Literature 1 Japanese Patent (JP-B) No. 3556835
Patent Literature 2 Japanese Patent (JP-B) No. 3829419
Patent Literature 3 Japanese Patent Application Laid-Open (JP-A) No. 9-286167
Patent Literature 4 Japanese Patent Application Laid-Open (JP-A) No. 2001-192591
Patent Literature 5 Japanese Patent Application Laid-Open (JP-A) No. 2002-235020
Patent Literature 6 Japanese Patent Application Laid-Open (JP-A) No. 2003-238875
Patent Literature 7 Japanese Patent Application Publication (JP-B) No. 60-045669
Patent Literature 8 Japanese Patent (JP-B) No. 3670148
Patent Literature 9 Japanese Patent Application Laid-Open (JP-A) No. 2003-292812
Patent Literature 10 Japanese Patent Application Laid-Open (JP-A) No. 2008-255241.

DISCLOSURE OF INVENTION

An object of the present invention is to eliminate shortcomings arose from the conventional techniques and to provide a magenta recording ink composition which is superior in ejection stability, water resistance and light resistance and enables obtaining high-quality images with high-color saturation and excellent color tone, which contains at least a solid solution pigment (A) containing quinacridone, a lake pigment (B) having a xanthene structure, an aqueous solvent, and water, wherein the solid solution pigment (A) has visible light absorption peaks at wavelength ranges of from 510 nm to 530 nm and from 540 nm to 560 nm, and a mass ratio (B/A) of the lake pigment (B) to the solid solution pigment (A) falls within the range of 0.1 to 5; and to provide an inkjet recording method as well as ink recorded matters using the ink composition.

The present inventors carried out extensive studies and examinations in order to solve the problems pertinent to the art of the present invention and have found that when an ink composition contains at least a solid solution pigment (A) having visible light absorption peaks at wavelength ranges of from 510 nm to 530 nm and from 540 nm to 560 nm and containing quinacridone, a lake pigment (B) having a xanthene structure, an aqueous solvent, and water, and a mass ratio (B/A) of the lake pigment (B) to the solid solution pigment (A) falls within the range of 0.1 to 5, the ink composition becomes superior in ejection stability, water resistance and light resistance and enables obtaining high-quality images with high-color saturation and excellent color tone, which leads to the accomplishment of the present invention.

The present invention is based on this finding. Means for solving the aforesaid problems are as follows.

<1> A magenta recording ink composition including: at least a solid solution pigment (A) containing quinacridone, a lake pigment (B) having a xanthene structure, an aqueous solvent, and water, wherein the solid solution pigment (A) has visible light absorption peaks at wavelength ranges of from 510 nm to 530 nm and from 540 nm to 560 nm, and a mass ratio (B/A) of the lake pigment (B) to the solid solution pigment (A) falls within the range of 0.1 to 5.

<2> The magenta recording ink composition according to the item <1>, wherein the solid solution pigment (A) is a solid solution (a) formed between an unsubstituted quinacridone and a dimethylquinacridone, a solid solution (b) formed between an unsubstituted quinacridone and a dichloroquinacridone or a mixture of (a) and (b), and the lake pigment (B) is C.I. Pigment Violet 1 and/or C.I. Pigment Violet 2.

<3> The magenta recording ink composition according to any one of the items <1> and <2>, wherein the aqueous solvent contains one or two or more of glycerin, 1,3-butandiol, 3-methyl-1,3-butandiol, hexylene glycol, polyethylene glycol, polypropylene glycol, 1,5-pentanediol, 1,6-hexanediol, propylene glycol, dipropylene glycol, and trimethylolpropane.

<4> The magenta recording ink composition according to any one of the items <1> to <3>, wherein each of the solid solution pigment (A) and the lake pigment (B) is dispersed by using a dispersant represented by any one of the following General Formulas (1) and (2), $$A1\text{-}O\text{-}(CH_2CH_2O)_k\text{-}SO_3M1 \qquad \text{General Formula (1)}$$

where A1 is any one of an alkyl group that has 8 to 12 carbon atoms and may be branched, a benzyl group, a styrenated phenol group, a distyrenated phenol group and a β-naphthyl group; k is an integer of 5 to 30; and M1 represents any one of an alkali metal, ammonium, phosphonium, and alkanol amine;

$$A1\text{-}O\text{-}(CH_2CH_2O)_i\text{-}H \qquad \text{General Formula (2)}$$

where A1 is any one of an alkyl group that has 8 to 12 carbon atoms and may be branched, a benzyl group, a styrenated phenol group, a distyrenated phenol group and a β-naphthyl group; and i is an integer of 20 to 60.

<5> The magenta recording ink composition according to the item <4>, further including a water-soluble polymer having a weight average molecular mass of 2,000 to 50,000.

<6> The magenta recording ink composition according to any one of the items <1> to <4>, further including polymer microparticles having a volume average particle diameter of 20 nm to 150 nm and/or a polymer emulsion containing the polymer microparticles.

<7> The magenta recording ink composition according to any one of the items <1> to <6>, further including any one of a polyol having 8 or more carbon atoms, and glycol ether having 8 or more carbon atoms.

<8> The magenta recording ink composition according to any one of the items <1> to <7>, having a viscosity of 5 mPa·s to 30 mPa·s at 25° C. and a surface tension of 20 mN/m to 35 mN/m and a pH of 7 to 11.

<9> An inkjet recording method including:
printing an ink on a recording medium by making the magenta recording ink composition according to any one of the items <1> to <8> adhere on the recording medium.

<10> The inkjet recording method according to the item <9>, wherein the printing is performed in such a manner that the ink is ejected by the action of thermal energy applied to the ink.

<11> The inkjet recording method according to the item <9>, wherein the printing is performed in such a manner that the ink is ejected by the action of mechanical energy transmitted to the ink.

<12> A recorded matter including: an image formed by the inkjet recording method according to any one of the items <9> and <11>.

With the use of a magenta recording ink composition which contains at least a solid solution pigment (A) containing quinacridone, a lake pigment (B) having a xanthene structure, an aqueous solvent, and water, wherein the solid solution pigment (A) has visible light absorption peaks at wavelength ranges of from 510 nm to 530 nm and from 540 nm to 560 nm, and a mass ratio (B/A) of the lake pigment (B) to the solid solution pigment (A) falls within the range of 0.1 to 5, it is possible to provide an image with high color saturation and with color comparable to the hue of the standard color.

With the use of a magenta recording ink composition in which the solid solution pigment (A) is a solid solution formed between an unsubstituted quinacridone and a dimethyl quinacridone and/or a solid solution formed between an unsubstituted quinacridone and a dichloroquinacridone, and the lake pigment (B) is a C.I. Pigment Violet 1 and/or C.I. Pigment Violet 2, it is possible to provide an image with further higher color saturation and with color comparable to the hue of the standard color.

A magenta recording ink composition superior in ejection stability can be provided by incorporating as the aqueous solvent to the magenta recording ink composition one or two or more of glycerin, 1,3-butandiol, 3-methyl-1,3-butandiol, hexylene glycol, polyethylene glycol, polypropylene glycol, 1,5-pentanediol, 1,6-hexanediol, propylene glycol, dipropylene glycol, and trimethylolpropane.

Also, a magenta recording ink composition still more superior in ejection stability can be provided by further incorporating into the magenta recording ink composition a water-soluble polymer having a weight average molecular mass of 2,000 to 50,000.

An image superior in fixing property and abrasion resistance can be provided by further incorporating into the magenta recording ink composition polymer microparticles having a volume average particle diameter of 20 nm to 150 nm and/or a polymer emulsion containing the polymer microparticles.

A magenta recording ink composition superior in ejection stability can be provided by further incorporating into the magenta recording ink composition a polyol having 8 or more carbon atoms or glycol ether.

A magenta recording ink composition further superior in ejection stability can be supplied by adjusting so as to have a viscosity of 5 mPa·s to 30 mPa·s at a temperature of 25° C., a surface tension of 20 mN/m to 35 mN/m, and a pH of 7 to 11.

An image with high color saturation and with color comparable to the hue of the standard color and superior in fixing property and abrasion resistance can be stably supplied by an inkjet recording method which includes printing an ink on a recording medium by making the magenta recording ink composition according to any one of the items <1> to <8> adhere on the recording medium.

Thermal energy is applied to the ink so as to eject the ink, thereby making it possible to stably supply an image with high color saturation and with color comparable to the hue of the standard color and superior in fixing property and abrasion resistance.

Further, mechanical energy is transmitted to the ink so as to eject the ink, thereby making it possible to stably supply an image with high color saturation and with color comparable to the hue of the standard color and superior in fixing property and abrasion resistance.

An ink recorded matter high color saturation and with color comparable to the hue of the standard color and superior in fixing property and abrasion resistance, which is formed by the inkjet recording method according to any one of the items <9> and <11>, can be stably supplied.

BEST MODE FOR CARRYING OUT THE INVENTION

Figure 1:
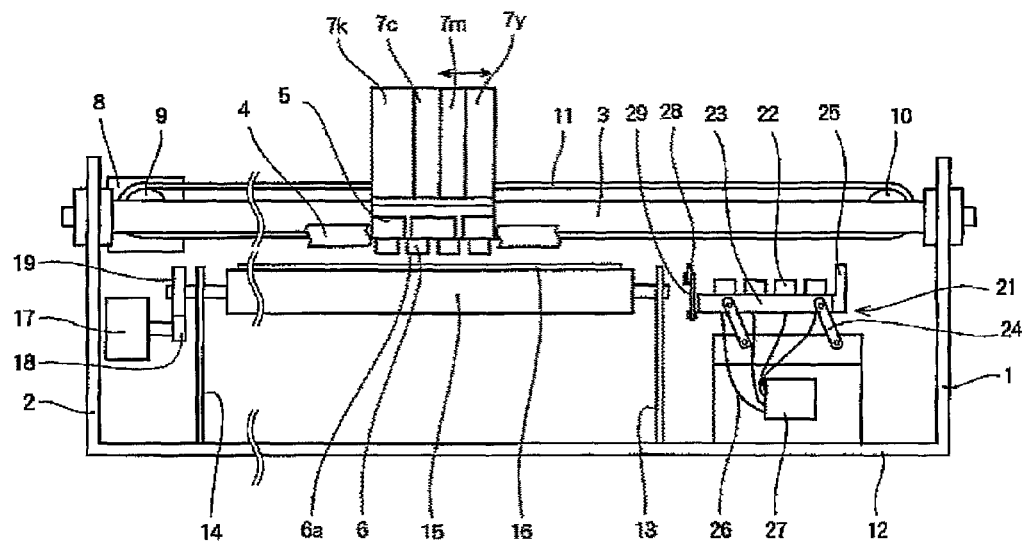
FIG. 1 is a schematic front view exemplarily showing a configuration of a serial type inkjet recording apparatus mounted with an ink cartridge accommodating therein a recording liquid of the present invention.

The following explains a magenta recording ink composition of the present invention in detail. The magenta recording ink composition of the present invention contains at least a solid solution pigment (A) containing quinacridone and having visible light absorption peaks at wavelength ranges of from 510 nm to 530 nm and from 540 nm to 560 nm, a lake pigment (B) having a xanthene structure, an aqueous solvent, and water, and may further contain other components. Hereinbelow, these components will be described more specifically.

[Solid Solution Pigment (A)]

The solid solution pigment (A) may be a solid solution pigment capable of forming a solid solution having visible light absorption peaks at wavelengths of 510 nm to 530 nm and 540 nm to 560 nm. For example, solid solutions each consisting of a combination of a dimethyl-substituted quinacridone and an unsubstituted quinacridone, a combination of an unsubstituted quinacridone and a dichloro-substituted quinacridone, and a combination of a dimethylquinacridone and a diketopyrrolopyrrole; solid solutions each consisting of two components; and mixtures of these solid solutions are preferably exemplified. Depending on the combination selected and the mixing ratio, a more brilliant color can be obtained, as compared to the case where an organic pigment is used alone.

The unsubstituted quinacridone may be any one of α-type, β-type and γ-type, and β-type or γ-type unsubstituted quinacridone is preferable from the viewpoint of storage stability. A mixing ratio of the two types of pigment constituting the solid solution pigment (A) is preferably 10/90 to 90/10, and more preferably 15/85 to 85/15. It should be noted that the solid solution pigment (A) is not merely a mixture of the two components and is preferably composed of solid solutions derived from the two components.

[Lake Pigment (B)]

As the lake pigment (B), pigments having a xanthene structure such as Rhodamine B, and Rhodamine 6G are exemplified, for example. Specific examples thereof include C.I. Pigment Violet 1, C.I. Pigment Violet 2, C.I. Pigment Violet 3, C.I. Pigment Violet 81:2. Those pigments have high transparency and develop a vivid violet color.

The total amount of coloring material particles of the solid solution pigment (A) and the lake pigment (B) contained in the recording ink is preferably 1% by mass to 15% by mass, on solid content basis, and more preferably 3% by mass to 10% by mass.

[Additional Pigment]

—Organic Pigment—

In the present invention, additional pigments can be used. These additional pigments encompass pigments capable of forming the solid solution pigment (A) and pigments other than the solid solution pigment (A) and the lake pigment (B) and are used within such a range that achievement of the object of the present invention should not be inhibited. For the organic pigments, aniline blacks as black pigments are exemplified. As color pigments, anthraquinone, phthalocyanine blue, phthalocyanine green, diazo pigments, monoazo pigments, perylene, heterocyclic yellow, other quinacridones and (thio)indigoide are exemplified. Among these, phthalocyanine pigments, quinacridone pigments, other diketopyrrolopyrrole pigments, monoazo yellow pigments, disazo yellow pigments, heterocyclic yellow pigments are superior in color developing property.

Typical examples of phthalocyanine blue pigments include metal-free copper phthalocyanine blue C.I. Pigment Blue 16, phthalocyanine blue and derivatives thereof (C.I. Pigment Blue 15:1, 15:3 and 15:4), and aluminum phthalocyanine.

Typical examples of other quinacridones include C.I. Pigment Orange 48 and 49, C.I. Pigment Red 122, 192, 202, 206, 207 and 209, C.I. Pigment Violet 19 and 42.

Typical examples of diketopyrrolopyrrole pigments include C.I. Pigment Red 254, 255, 264 and 272.

Typical examples of monoazo yellow pigments include C.I. Pigment Yellow 74, 109, 128 and 151.

Typical examples of disazo yellow pigments include C.I. Pigment Yellow 14, 16, 17 and 155.

Typical examples of heterocyclic yellow pigments include C.I. Pigment Yellow 117 and 138.

Other suitable coloring pigments are described in "The Colour Index $3^{rd}$ edition (The Society of Dyers and Colourists, 1982).

—Other Lake Pigment—

There are other water-insoluble lake pigments to which extender pigment(s), metal salt, tannin, phosphomolybdic acid, phosphotungstic acid, etc, are added so as to be insoluble in water. These other water-insoluble lake pigments are broadly classified into acidic dye lakes and basic dye lakes.

Acidic dye lakes are each made by laking a dye having an acidic group such as sulfonic acid group and carboxyl group in its molecules with the use of a metal salt such as aluminum, calcium and barium so as to be a pigment insoluble in water. Examples thereof include C.I. Pigment Yellow 100, C.I. Pigment Yellow 104, C.I. Pigment Red 172, C.I. Pigment Red 193, C.I. Pigment Blue 24:1 and C.I. Pigment Blue 63.

Basic dye lakes are each made by laking a dye having an amino group or derivatives thereof in its molecules with the use of a tannic acid, phosphotungstic acid, phosphomolybdic acid and complex acids thereof. Examples thereof include C.I. Pigment Violet 3, C.I. Pigment Violet 27, C.I. Pigment Violet 81:2, C.I. Pigment Blue 1, C.I. Pigment Blue 56, C.I. Pigment Blue 61, and C.I. Pigment Blue 62, besides C.I. Pigment Violet 1 and C.I. Pigment Violet 2.

—Dispersant—

After microparticulating the above-mentioned pigment(s), a dispersant is used for dispersing the microparticulated pigments in an aqueous solution so as to prepare a dispersoid. The dispersant may be suitably selected from among primarily nonionic surfactants and anionic surfactants, or polymer dispersants in accordance with the intended use.

(Nonionic Dispersant)

Examples of the nonionic dispersants (surfactants) include polyoxyethylene alkyl ethers, polyoxyethylene alkylallylethers, polyoxyethylene polyoxypropylene glycols, glycerin esters, sorbitan esters, sucrose esters, polyoxyethylene ethers of glycerin esters, polyoxyethylene ethers of sorbitan esters, polyoxyethylene ethers of sorbitol esters, fatty acid alkanolamides, polyoxyethylene fatty acid amides, amine oxides, polyoxyethylene alkylamines, polyoxyethylene-β-naphthylethers, polyoxyethylene styryl phenyl ethers, and polyoxyethylene distyryl phenyl ethers. In the present invention, dispersants each having a structure, in particular, as shown in the following Formulas (1A), (1B) and (1C) may be effectively used.

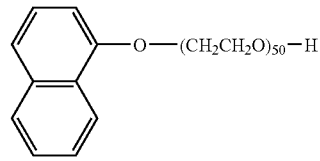

Formula (1A)

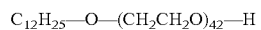

Formula (1B)

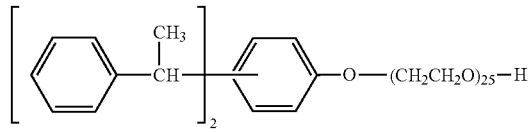

Formula (1C)

(Anionic dispersant)

Examples of the anionic dispersants (surfactants) include alkyl sulfates, alkyl ether sulfates, alkylester sulfates, alkylallyl ether sulfates, alkyl sulfonates, sulfosuccinates, alkylallyl and alkylnaphthalene sulfonates, alkyl phosphates, polyoxyethylene alkyl ether phosphates, alkylallyl ether phosphates, polyoxyethylene alkyl ether sulfates, polyoxyethylene styrylphenyl ether sulfates, and polyoxyethylene distyrylphenyl ether sulfates. In the present invention, dispersants each having a structure, in particular, as shown in the following Formulas (2A) and (2B) may be effectively used.

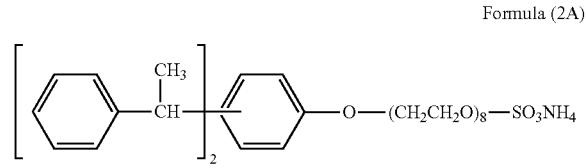

Formula (2A)

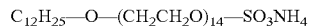

Formula (2B)

(Polymer Dispersant)

Examples of the polymer dispersants include polyacrylic acids, polymethacrylic acids, acrylic acid-acrylonitrile copolymers, vinyl acetate-acrylic acid ester copolymers, acrylic acid-acrylic acid alkylester copolymers, styrene-acrylic acid copolymers, styrene-methacrylic acid copolymers, styrene-acrylic acid-acrylic acid alkylester copolymers, styrene-methacrylic acid-acrylic acid alkylester copolymers, styrene-α-methylstyrene-acrylic acid copolymers, styrene-α-methylstyrene-acrylic acid copolymers, acrylic acid alkylester copolymers, styrene-maleic acid copolymers, vinylnaphthalene-maleic acid copolymers, vinylacetate-ethylene copolymers, vinylacetate-fatty acid vinylethylene copolymers, vinylacetate-maleic acid ester copolymers, vinylacetate-crotonic acid copolymers, and vinyl acetate-acrylic acid copolymers. These dispersants may be used alone or in combination.

The dispersoid is produced by the following method. Specifically, the dispersant mentioned above is dissolved in an aqueous medium, then the pigment particles are added thereto, the mixture solution thus prepared is sufficiently wetted and then agitated at high speed by means of a homogenizer; or kneaded and dispersed by a dispersing kneader using a ball, such as a bead mill or ball mill; a high-shear dispersing kneader like a roll mill; a ultrasonic dispersing device or the like. However, after such a kneading dispersion step, coarse particles are often contained in the resultant dispersoid, which may cause inkjet nozzle clogging of an inkjet nozzle and clogging at an ink supply path. Thus, there is a need to remove particles of 1 μm or larger in diameter using a filter or centrifuge.

The amount of the dispersant added to the coloring material particles is preferably 1% by mass to 100% by mass, and more preferably 10% by mass to 50% by mass. When the amount is small, the pigment contained may not be sufficiently microparticulated. When the amount is excessively large, an excessive amount of dispersant component that is not adsorbed to the pigment adversely affects the ink properties, thereby possibly leading to image feathering and degradation in water resistance and is image abrasion resistance.

The mixing ratio of the dispersant to the coloring material particles in the recording ink is preferably 10% to 100%, and more preferably 25% to 50%.

—Polymer—

As the water-soluble polymer, and the polymer constituting the polymer microparticles or polymer emulsion used in the present invention, polyester resin, polyurethane resin, vinyl resin, and acrylic resin may be suitably used.

(Polyester Resin)

The polyester resin is constituted by polyvalent carboxylic acid and polyhydric alcohol.

Examples of the polyvalent carboxylic acid include aromatic dicarboxylic acids such as terephthalic acid, isophthalic acid, orthophthalic acid, 1,5-naphthalenedicarboxylic acid, 2,6-naphthalendicarboxylic acid, diphenic acid, sulfoterephthalic acid, 5-sulfoisophthalic acid, hexahydrophthalic anhydride, 4-sulfophthalic acid, 4-sulfonapthalene-2,7 dicarboxylic acid, and 5[4-sulfophenoxy]isophthalic acid; aliphatic dicarboxylic acids such as succinic acid, adipic acid, azelaic acid, sebacic acid, and dodecanedicarboxylic acid; and other trivalent or higher polyvalent carboxylic acids.

Examples of the polyhydric alcohol include aliphatic polyhydric alcohols such as ethylene glycol, propylene glycol, 1,3-propanediol, 2,3-butanediol, 1,4-butanediol, 1,5-pentanediol, 1,6-hexanediol, neopentyl glycol, dipropylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, Spiro glycol, tricyclodecane diol, tricyclodecanedimethanol, metaxylene glycol, orthoxylene glycol, 1,4-phenylene glycol, bisphenol A, and lactone-based polyester polyols; other aliphatic polyhydric alcohols and aromatic polyhydric alcohols.

(Polyurethane Resin)

The polyurethane resins are constituted by isocyanates and compounds having a functional group capable of reacting with isocyanates. Examples of the polyurethane resins include resins polymerized by using each of these components alone or a combination of two or more.

Examples of the isocyanates include aliphatic polyisocyanates such as ethylene diisocyanate, trimethylene diisocyanate, tetramethylene diisocyanate, hexamethylene diisocyanate, octamethylene diisocyanate, and nonamethylene diisocyanate; aliphatic polyisocyanates such as isophorone diisocyanate, bis(isocyanatomethyl)cyclohexane, dicyclohexylmethane diisocyanate, cyclohexane diisocyanate, methylcyclohexane diisocyanate, and dicyclohexyldimethylmethane diisocyanate; aromatic polyisocyanates such as phenylene diisocyanate, tolylene diisocyanate, ethylphenylene diisocyanate, isopropylenephenylene diisocyanate, dimethylphenylene diisocyanate, diisopropylphenylene diisocyanate, trimethylbenzene triisocyanate, benzene triisocyanate, naphthalene diisocyanate, methyl naphthalene diisocyanate, biphenyl diisocyanate, and tolidinediisocyanate; and other isocyanates such as sulfur-containing aliphatic isocyanates, aliphatic disulfide-based isocyanates, aromatic sulfone-based isocyanates, sulfonate-based isocyanates, aromatic sulfone amides, and sulfur-containing heterocyclic compounds.

Examples of the compound having a functional group capable of reacting with isocyanates include aliphatic polyols such as ethylene glycol, diethylene glycol, triethylene glycol, tetraethylene glycol, propylene glycol, dipropylene glycol, butylene glycol, neopentyl glycol, glycerin, trimethylolethane, trimethylolpropane, butanetriol, 1,2-methylglycoside, pentaerythritol, dipentaerythritol, sorbitol, erythritol, threitol, ribitol, arabinitol, xylitol, allitol, mannitol, dorsitol, iditol, glycol, inositol, hexanetriol, triglycerose, diglyperol, polyethylene glycol, polypropylene glycol, polytetramethylene ether glycol, tris(2-hydroxyethyl)isocyanurate, cyclobutanediol, cyclopentanediol, cyclohexanediol, cycloheptanediol, cyclooctanediol, polylactonediol, cyclohexane dimethanol, hydroxypropylcyclohexanol, dicyclohexanediol, cyclohexanetriol, multitol, and lactitol; aromatic polyols such as dihydroxynaphthalene, trihydroxynaphthalene, tetrahydroxynaphthalene, dihydroxybenzene, benzenetriol, biphenyltetraol, pyrogallol, (hydroxynapthtyl)pyrogallol, trihydroxyphenanthrene, bisphenol A, bisphenol F, xylylene glycol, di(2-hydroxyethoxy)benzene; condensation reaction products between organic acids, such as oxalic acid, glutamic acid, adipic acid, acetic acid, phthalic acid, isophthalic acid, salicylic acid, and pyromellitic acid, and the above-mentioned polyols; halogenated polyols, addition reaction products between the above-mentioned polyols and alkylene oxide such as ethylene oxide and propylene is oxide, addition reaction products between alkylene polyamine and alkylene oxide, 2,2-dimethylol lactic acid, 2,2-dimethylol propionic acid, 2,2-dimethylol butanoic acid, 2,2-dimethylol valeric acid, 3,4-diaminobutane sulfonic acid, 3,6-diamino-2-toluene sulfonic acid, and caprolactone-modified products thereof, polyamino compounds, polythiol compounds, and α-amino acids. These may be used alone or in combination in the form of mixture.

(Vinyl Resin and Acrylic Resin)

The vinyl resin and the acrylic resin are not particularly limited. For example, those obtained from the polymerizable monomers described below are exemplified. Examples of the polymerized monomers include o-methylstyrene, m-methylstyrene, p-methylstyrene, x-methylstyrene, p-ethylstyrene, 2,4-dimethylstyrene, p-tert-butylstyrene, p-chlorostyrene, p-chlorostyrene, and vinyl-based aromatic hydrocarbons such as divinylbenzene; acrylic acid esters such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethylhexyl methacrylate, hexyl methacrylate, octyl methacrylate, nonyl methacrylate, decyl methacrylate, undecyl methacrylate, and dodecyl methacrylate; unsaturated carboxylic acids such as acrylic acid, methacrylic acid, itaconic acid, and maleic acid; and resins that are polymerized by singularly using any one of (meth)acrylamide, N-substituted maleimide, maleic anhydride, (meth)acrylonitrile, vinyl ketone, vinyl acetate, and vinylidene chloride or resins that are polymerized by using a combination thereof.

—Water-Soluble Polymer—

The addition of a water-soluble polymer to the recording ink of the present invention makes it possible to improve the storage stability of the ink. The water-soluble polymer may be added along with additives such as aqueous solvent and surfactants when the pigment(s) are dispersed using a dispersing device such as bead mill, and atrighter, or when a recording ink composition is prepared, however, it is more preferable to add it when preparing a recording ink composition.

The water-soluble polymer used in the present invention exhibits solubility by addition of ionic groups on the polymer surface. For such ionic groups, hydroxyl groups, sulfonic groups, carboxyl groups, sulfate groups, phosphate groups, phosphonate groups, and phosphine groups or alkaline metal salt groups thereof, ammonium salt groups thereof, or primary, secondary, or tertiary amine groups are exemplified. Introduction of the ionic groups is carried out in parallel with synthesis of the polymer by adding the monomer having ionic groups. Examples of the salt groups include ammonium-based ions, Li, Na, K, Mg, Ca, Cu and Fe. Preferred is Li, K or Na.

In the present invention, the amount of the water-soluble polymer relative to the total amount of a coloring material of pigment in the ink composition is preferably 1% by mass to 50% by mass, and more preferably 5% by mass to 30% by mass. When the amount of the water-soluble polymer to the pigment is less than 1% by mass, sufficient dispersion stability may not be obtained. When it is more than 50% by mass, the ejection of the resultant ink becomes unstable due to the high-viscosity of the tine, thereby possibly leading to nozzle clogging.

—Polymer Microparticles and Polymer Emulsion—

The polymer microparticles or the polymer emulsion used in the present invention can be obtained by a conventionally known method, e.g. by emulsification polymerization of the polymer in water in presence of a polymerizable catalyst and an emulsifier.

The polymer microparticles and polymer emulsion can exhibit superior water dispersibility by incorporation of ionic groups on the surfaces. For such ionic groups, sulfonic groups, carboxyl groups, sulfate groups, phosphate groups, phosphonate groups, and phosphine groups or alkaline metal salt groups thereof, ammonium salt groups thereof, or primary, secondary, or tertiary amine groups are exemplified. Preferred are carboxylic acid-alkali metal salt groups, carboxylic acid-ammonium salt groups, sulfonic acid-alkali metal salt groups and sulfonic acid-ammonium salt groups, with sulfonic acid-alkali metal salt groups and sulfonic acid-ammonium salt groups being particularly preferred. Introduction of the ionic groups is carried out in parallel with synthesis of the polymer by adding the monomer having ionic groups. Examples of the salt groups include ammonium-based ions, Li, Na, K, Mg, Ca, Cu and Fe. Preferred is Li, K or Na.

In the present invention, the amount of the polymer microparticles or polymer emulsion to the ink composition is preferably 0.5% by mass to 20% by mass, and more preferably 1% by mass to 5% by mass. When the amount is less than 0.5% by mass, sufficient abrasion resistance and water resistance may not be obtained. When it is more than 20% by mass, the ejection of the resultant ink becomes unstable due an increase in viscosity of the ink, resulting from air-drying, thereby possibly leading to nozzle clogging.

—Dispersion of Pigment by Polymer Coating—

The pigment can be dispersed in an aqueous medium by making the pigment into microparticles and coating the surface thereof with the polymer. For the coating, all conventionally known methods, such as microcapsulation or emulsification, may be employed. Examples of the conventionally known methods include chemical production methods, physical production methods, physical and chemical treatments, and mechanical production methods.

More specifically, the dispersion methods of pigment by polymer coating are as follows:

Acid separation method (a method in which at least part of anionic groups of organic polymer compounds containing the anionic groups is neutralized using a basic compound; in accordance with this, solubility to water is provided and the solubility-provided anionic groups are mixed and kneaded along with a coloring material in an aqueous medium, and then, the resultant substance is made neutral or acidic using acidic compounds, organic compounds are separated and bonded to the coloring material, and then the substance is neutralized and dispersed);

Phase inversion emulsification method (a method in which a mixture containing anionic organic polymers which are dispersible in water and coloring material(s) is prepared as an organic solvent phase, and water is introduced to the organic solvent phase or the organic solvent phase is introduced to water);

Interfacial polymerization method (a method of forming a wall film in which two types of monomers or two types of reactants are separately dissolved in a dispersed phase and a continuous phase and then the wall film is formed by reacting both materials at a phase boundary thereof);

In-situ polymerization method (a method in which two types of materials, namely, a liquid or gaseous monomers and a catalyst or a reactive material are supplied from one side of nuclear particles of continuous is phase so as to cause a reaction, thereby forming a wall film);

In-liquid cure coating method (a method of forming a wall film in which droplets of a polymer solution containing core material particles are insolubilized in the liquid using a curing agent or the like, thereby forming a wall film);

Coacervation (phase separation) method (a method of forming a wall film in which a polymer-dispersed liquid containing core material particles dispersed therein is separated into a coacervate with a high concentration of polymers (dense phase) and a sparse phase, and a wall film is formed);

In-liquid drying method (a method of forming a wall film in which a liquid containing core materials in a solution of wall film materials is prepared and a dispersion liquid is supplied to the liquid where a continuous phase of the dispersion liquid is not miscible so as to have a complex emulsion, and then a wall film is formed by gradually removing medium into which the wall film materials are dissolved);

Fusion dispersion cooling method (a method of forming a wall film, in which wall film materials which are fused upon heating and are solidified at normal temperature are used, the materials are heated to be a liquid, and core material particles are dispersed thereinto, the core material particles are made to be microparticles and cooled, thereby forming a wall film);

Air suspension coating method (a method of forming a wall film in which core material particles in a powder form are suspended in the air using a fluidized bed, and a coating liquid is sprayed and mixed with the core material particles floating in an airflow, and then a wall film is formed); and Spray drying method (a method of forming a wall film in which an undiluted encapsulating solution is sprayed and brought into contact with a heated air, and a wall film is formed by allowing a volatile component to be evaporated and dried).

In particular, the phase inversion emulsification method, acid separation method, and interfacial polymerization method are employed in inkjet process.

The mixing ratio of the coating polymer to the coloring material of pigment in the recording ink is preferably 30% to 200%, and more preferably 50% to 120%.

—Penetrant—

Addition of a penetrant to ink makes it possible to decrease the surface tension of the resultant ink and to promote penetration of the ink into a recording medium such as paper after ink droplets adhere to the recording medium, thereby making it possible to reduce occurrence of feathering and color bleed. The desired surface tension range in the present invention is 35mN/m or lower. As the penetrant, an anionic surfactant or a nonionic surfactant is usually used, and it should be selected depending on the type of coloring material and the combination of wetting agent and an aqueous organic solvent used within such a range that the dispersion stability is not impaired.

Examples of the anionic surfactant include polyoxyethylene alkyl ether acetate salts, dodecylbenzene sulfonates, laurates, and salts of polyoxyethylene alkyl ether sulfates.

Examples of the nonionic surfactants include polyols, glycol ethers, polyoxyethylene alkyl ethers, polyoxyethylene alkyl esters, polyoxyethylene sorbitan fatty acid esters, polyoxyethylene alkyl phenyl ethers, polyoxyethylene alkyl amines, polyoxyethylene alkyl amides, and acetylene glycols.

For the acetylene glycol-based surfactants, acetylene glycol-based surfactants such as 2,4,7,9-tetramethyl-5-desine-4,7-diol, 3,6-dimethyl-4-octine-3,6-diol, and 3,5-dimethyl-1-hexine-3-ol, (e.g. SURFINOL 104, 82, 465, 485 or TG available from Air Products and Chemicals Inc. (U.S.)) may be used. Particularly, SURFINOL 465, 104 and TG can provide superior printing quality.

Examples of fluorochemical surfactants include perfluoroalkyl sulfonates, perfluoroalkyl carboxylates, perfluoroalkyl phosphates, perfluoroalkyl ethylene oxide adducts, perfluoroalkyl betaines, perfluoroalkyl amine oxides, and perfluoroalkyl ether compounds. As commercially available fluorochemical compounds, SURFLON-111, S-112, S-113, S121, S131, S132, S-141 and S-145 (produced by Asahi Glass Co.); FRORARD FC-93, FC-95, FC-98, FC-129, FC-135, FC-170C, FC-430 and FC-431 (produced by Sumitomo 3M Ltd.); MEGAFAC F-470, F1405 and F-474 (produced by Dainippon Ink and Chemicals, Inc.); ZONYL TBS, FSP, FSA, FSN-100, FSN, FSO-100, FSO, FS-300 and UR (produced by DuPont); FT-110, 250, 251 and 400S (produced by Neos Co.) etc. are available with ease and may be used in the present invention. The above-mentioned surfactants may be used alone or in combination in the form of mixture.

In the present invention, as a penetrant, in particular, the use of polyol having carbon atoms of 8 to 11 or a surfactant represented by any one of the following General Formulas (3) to (9) makes it possible to obtain further superior printing quality.

General Formula (3)

In General Formula (3), R2 is an alkyl group that may be branched and has 6 to 14 carbon atoms; m is an integer of 3 to 12, and M2 is an alkali metal, a quaternary ammonium, a quaternary phosphonium or an alkanol amine.

General Formula (4)

In General Formula (4), R3 is a branched alkyl group having 5 to 16 carbon atoms; and M3 is an alkali metal, a quaternary ammonium, a quaternary phosphonium or an alkanol amine.

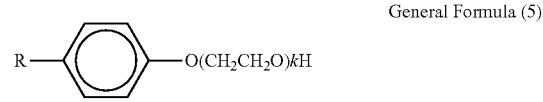

General Formula (5)

In General Formula (5), R is a carbon chain that may be branched and has 6 to 14 carbon atoms; and k is an integer of 5 to 20.

General Formula (6)

In General Formula (6), R5 is a carbon chain that may be branched and has 6 to 14 carbon atoms; and l is an integer of 5 to 20.

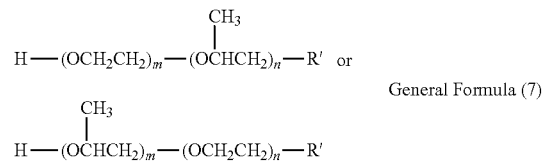

General Formula (7)

In General Formula (7), R' is a carbon chain having 6 to 14 carbon atoms; and each of m and n is an integer equal to or smaller than 20.

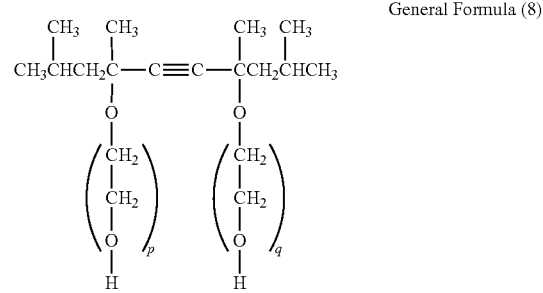

General Formula (8)

In General Formula (8), each of p and q is an integer of 0 to 40.

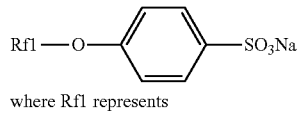

General Formula (9)

where Rf1 represents

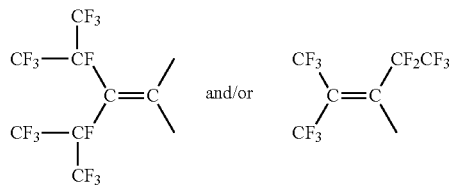

and/or

[Aqueous Solvent]
—Wetting Agent—

In the ink of the present invention, water is used as a liquid medium, and with a view to preventing the ink from being dried, improving the dispersion stability and for other purposes, the following aqueous solvents are used. Note that these aqueous solvents may be used in combination in the form of mixture.

Specific examples thereof include polyhydric alcohols such as glycerin, diethylene glycol, 1,3-butanediol, 3-methyl-1,3-butanediol, triethylene glycol, propylene glycol, dipropylene glycol, trimethylolpropane, trimethylolethane, ethylene glycol, diethylene glycol, dipropylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-imidazolidinone, e-caprolactam or γ-butyrolactone; amides such as formamide, N-methyl formamide, N,N-dimethyl formamide; amines such as monoethanolamine, dimethanolamine, triethanolamine, monoethylamine, diethylamine, and triethylamine; sulfur-containing compounds such as diemthylsulfoxide, sulfolane, and thiodiethanol; propylene carbonate, and ethylene carbonate.

As additional wetting agents, those containing sugar are preferred. Examples of the sugar include monosaccharides, disaccharides, oligosaccharides (including trisaccharide and tetrasaccharide) and polysaccharides. Preferred examples thereof include glucose, mannose, fructose, ribose, xylose, arabinose, galactose, maltose, cellobiose, lactose, sucrose, trehalose, and maltotriose. Note that the term "polysaccharides" means general polysaccharides, including substances that exist widely in nature, such as α-cyclodextrin, and cellulose.

Examples of derivatives of these sugars include reducing sugars of the above-mentioned sugars (e.g. sugar alcohols which are represented by the general formula, $HOCH_2(CHOH)nCH_2OH$ (where n is an integer of 2 to 5), oxidized sugars (e.g. aldonic acids, and uronic acids), amino acids, and thio acids. Of these, sugar alcohols are preferred. Specific examples thereof include maltitol, and sorbitol.

In the present invention, in particular, it is possible to produce an ink superior in storage stability and ejection stability by using, as a wetting agent, an aqueous solvent of glycerin, 1,3-butanediol, 3-methyl-1,3-butanediol, hexylene glycol, polyethylene glycol, polypropylene glycol, 1,5-pentanediol, 1,6-hexanediol, propylene glycol, dipropylene glycol, or trimethylolpropane.

The mixing ratio between coloring material microparticles and the wetting agent significantly affects the ejection stability of the resultant ink ejected from an inkjet head. When the amount of the wetting agent blended is small, though the solid content of coloring material microp articles is high, the water evaporation in the vicinity of an ink meniscus is promoted to cause an ejection defect.

The amount of the wetting agent blended in the ink is preferably 10% by mass to 50% by mass, and more preferably 15% by mass to 40% by mass. An ink containing a wetting agent within this range achieves exceptionally satisfactory test results of drying property, storage stability and reliability.

—pH Adjustor—

It is possible to stabilize the dispersed condition and the ejection of the resultant ink by adding a pH adjustor to the ink composition so as to keep it alkaline. When the pH of the ink is 11 or higher, the amount of the inkjet head and ink supply unit eluted is large, causing problems such as ink degeneration, ink leakage and ejection defects. It is more preferable to add a pH adjustor when the pigment is kneaded and dispersed with the dispersant in water rather than to add it with additives such as the wetting agent and penetrant after kneading and dispersion treatment. This is because some pH adjustors break the dispersion by being added to aqueous media. The pH adjustor preferably contains at least one or more types of alcohol amines, alkali metal hydroxides, ammonium hydroxides, phosphonium hydroxides and alkali metal carbonates. Examples of the alcohol amines include diethanolamine, triethanolamine, and 2-amino-2-ethyl-1,3-propanediol. Examples of the alkali metal hydroxides include lithium hydroxides, sodium hydroxides, and potassium hydroxides. Examples of the ammonium hydroxides include ammonium hydroxides, quaternary ammonium hydroxides, and quaternary phosphonium hydroxides. Examples of the alkali metal carbonates include lithium carbonates, sodium carbonates, and potassium carbonates.

Further, to the recording ink composition of the present invention, conventionally known additives may be suitably selected and added. Examples of the additives include resin emulsions, antiseptic antifungal agents, anti-corrosion agents, antioxidants, ultraviolet absorbers, oxygen absorbers, light absorbers and anti-kogation agents.

—Antiseptic Antifungal Agent—

As the antiseptic antifungal agent, dehydrosodium acetate, sodium sorbate, sodium 2-pyridinthiol-1-oxide, sodium benzoate, sodium pentachlorophenol or the like may be used in the present invention.

Examples of chelate reagents include sodium ethylene diamine tetraacetic acid, sodium nitrilotriacetic acid, sodium hydroxyethyl-ethylene-diamine triacetic acid, sodium diethylene triamine pentacetic acid, and sodium uracil diacetic acid.

—Anti-Corrosion Agent—

Examples of the anti-corrosion agent include acidic sulfite, sodium thiosulfate, ammonium thiodiglycolate, diisopropyl ammonium nitrate, pentaerythritol tetranitrate, and dicyclohexyl ammonium nitrate.

—Antioxidant—

As the antioxidant, phenol-based antioxidants (including hindered phenol-based antioxidants), amine-based antioxidants, sulfur-based antioxidants, and phosphorus-based antioxidants are exemplified.

Examples of the phenol-based antioxidants (including hindered phenol-based antioxidants) include butylated hydroxy anisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propyonyloxy]ethyl]-2,4,8,10-tetraixaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Examples of the amine-based antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3(3,5-di-tert-butyl-4-dihydroxyphenyl) propionate]methane, and 1,1,3-tris(2-methyl-4-hydroxy-5-tert-butylphenyl)butane.

Examples of the sulfur-based antioxidants include dilauryl 3,3'-thiodipropyonate, distearylthiodipropyonate, laurylstearylthiodipropyonate, dimyristyl-3,3'-thiodipropyonate, distearylβ,β'-thiodipropyonate, 2-mercaptobenzoimidazole, and dilauryl sulfide.

Examples of the phosphoric antioxidants include triphenyl phosphite, octadecyl phosphite, triisodecyl phosphite, trilauryltrithio phosphite, and trinonylphenyl phosphite.

—Ultraviolet Absorber—

Examples of the ultraviolet absorber include benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Examples of the benzophenone-based ultraviolet absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole-based ultraviolet absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chloro-benzotriazole.

Examples of the salicylate-based ultraviolet absorbers include phenyl salicylate, p-tert-butylphenyl salicylate, and p-octylphenyl salicylate.

Examples of the cyanoacrylate-based ultraviolet absorbers include ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of the nickel complex salt-based ultraviolet absorbers include nickelbis(octylphenyl)sulfide, 2,2'-thiobis(4-tert-octylphenolate)-n-butylamine nickel (II), 2,2'-thiobis(4-tert-octylphelate)-2-ethylhexyl amine nickel (II), 2,2'-thiobis(4-tert-octylphelate)triethanol amine nickel (II).

—Anti-Kogation Agent—

An anti-kogation agent may be added to a recording liquid used in the present invention.

The term "kogation" is a problem that could be caused in a thermal head which is adapted to eject a recording liquid by utilizing a foaming effect of the recording liquid when a current is applied to a heater so as to instantaneously heat the recording liquid, and which means a phenomenon that the recording liquid components deteriorate when heated, causing adhesion of deteriorated matters (burnt deposits of ink components) onto the heater. When kogation occurs, heating by heater is not normally performed, resulting in weaken its ejection force, in the worst case, causing no ejection of the recording liquid.

As the anti-kogation agent, polyphosphoric acids, polyaminocarboxylic acids, aldonic acids, hydroxycarboxylic acids, polyol phosphate esters, and salts thereof, or acids having an amino group and/or salts thereof, or ammonium salts of acids having a methyl group or a methylene group and carboxyl group are exemplified.

Examples of the polyphosphoric acids include pyrophosphoric acids, tripolyphosphoric acids, and hexametaphosphoric acids.

Examples of the polyaminocarboxylic acids include dicarboxylic acids such as oxalic acid, malonic acid, succinic acid, and glutaric acid; ethylenediamine tetraacetic acids, iminodiacetic acids, and nitrilotriacetic acids.

Examples of the aldonic acids include glycolic acids, glyceric acids, gluconic acids, galactonic acids, and glucoheptonic acids.

Examples of the hydroxycarboxylic acids (sometimes called oxycarboxylic acids) include citric acids, malic acids, lactic acids, glycolic acids, glyceric acids, mandelic acids, and tartaric acids.

Examples of the polyol phosphate ester include α-glycerophosphoric acids, and β-glycerophosphoric acids.

Among these, hydroxycarboxylic acids (oxycarboxylic acids) such as citric acids, lactic acids, gluconic acids (when gluconic acids are in the form of solids, they exist as δ-gluconolactone or γ-gluconolactone), and tartaric acids; and α-glycerophosphoric acids and β-glycerophosphoric acids etc. are preferable because they are highly soluble in water. Further, citric acids and gluconic acids are particularly preferable. Note that these compounds may be used in the form of acids or salts. More specifically, these compounds may be used in the form of alkali metal salts, ammonium salts or organic amine salts such as triethanolamine, dimethanolamine, monoethanolamine, and triisopropanolamine.

When any of these compounds are used, commercially available compounds in the form of salts may be directly used or may be used after adding thereto an alkali agent so as to be in the form of salts of organic acids.

As the alkali agent used on that occasion, lithium hydroxide, sodium hydroxide, potassium hydroxide, ammonia water (ammonium hydroxide), and organic amines (e.g. triethanolamine, diethanolamine, monoethanolamine, diisopropanolamine, triisopropanolamine, tetramethylammonium hydroxide, tetraethylammonium hydroxide, and tetra-n-propylammonium hydroxide) are exemplified. Among the alkali agents described above, it is preferred to use ammonium salts.

When an ink according to the present invention is produced, the above-mentioned anti-kogation agents may be used alone or in combination. It is preferable to use the anti-kogation agent in a total amount of 0.005% by mass to 20% by mass to the total amount of the resultant recording liquid. The total amount of the anti-kogation agent is more preferably in the range of 0.05% by mass to 12% by mass. By adjusting the total amount of the anti-kogation agent to the resultant recording liquid to fall within the above range, it is possible to yield an ink which has an advantageous effect of reducing kogation and is least likely to cause nozzle clogging in recording heads.

Examples of the acids having an amino group and/or salts thereof include acids having an amino group such as amidosulfuric acid (sometimes called sulfaminic acid), aminomethanesulfonic acid, taurine (sometimes called 2-aminoethanesulfonic acid), carbamic acid, glycin, alanine, asparaginic acid, glutamic acid, phenylalanine, leucine, isoleucine, threonine, tryptophan, valinemethionine, and lysine. Among these, compounds having a sulfone group are preferable in terms that they are highly soluble in water and have an advantageous effect of prolonging the operating life of recording heads, as mentioned above. Specific examples of the compounds having a sulfone group include amidosulfuric acid (sulfaminic acid), aminomethanesulfonic acid, and taurine (2-aminoethanesulfonic acid). Among these, taurine (2-aminoethanesulfonic acid) is particularly preferable in 1.5 terms of availability.

Meanwhile, when the above-mentioned acid having an amino group and/or salts thereof are used, commercially available compounds in the form of salts may be directly used or may be used after adding thereto the following alkali agents so as to be in the form of salts of organic acids. Examples of the alkali agents include lithium hydroxide, sodium hydroxide, potassium hydroxide, ammonia water (ammonium hydroxide), and organic amines (e.g. triethanolamine, diethanolamine, monoethanolamine, diisopropanolamine, triisopropanolamine, tetramethylammonium hydroxide, tetraethylammonium hydroxide, and tetra-n-propylammonium hydroxide). Among these, it is preferred to use ammonium salts of organic acids having an amino group.

These compounds may be used alone or in combination. The total amount of the acids having an amino group and/or salts thereof contained in the total amount of the resultant recording liquid is preferably 0.005% by mass to 20% by mass, and more preferably 0.05% by mass to 12% by mass. By adjusting the total amount of the acids having an amino group and/or salts thereof to the resultant recording liquid to fall within the above range provided that the acids and/or salts are present with any of the above-mentioned polyphosphoric acids, polyaminocarboxylic acids, aldonic acids, hydroxycarboxylic acids, polyol phosphate esters or salts thereof, it is possible to yield an ink which has an advantageous effect of reducing kogation and is least likely to cause nozzle clogging in recording heads.

In the ink of the present invention, a mass ratio of the total amount of the polyphosphoric acid, polyaminocarboxylic acid, aldonic acid, hydroxycarboxylic acid, polyol phosphate ester or salts thereof contained in the ink relative to the total amount of the acids having an amino group and/or salts thereof in the ink preferably falls within the range of 20:1 to 1:20. When the mass ratio falls within the above range, it is possible to sufficiently exert the effect of reducing kogation on heater surfaces and to effectively prevent damage to outermost surfaces of protective layers.

The above-mentioned ammonium salts having a methyl group or a methylene group and a carboxyl group preferably have visually little effect on the color tone of ink. In other words, an aqueous solution itself composed of the acids is preferably colorless. Also, it is preferable that the number of atoms per molecule of the acids be 10 or less and the number of oxygen atoms per molecule of the acids be 3 to 6. Specific examples of such acids include malonic acids, succinic acids, glutaric acids, adipic acids, lactic acids, malic acids, asparaginic acids, and glutamic acids.

These ammonium salts having a methyl group or a methylene group and a carboxyl group may be used alone or in combination. Further, the total amount of at least one compound selected from the ammonium salts of acids having a methyl group or a methylene group and a carboxyl group is, in view of sufficient effect of reducing kogation and causing less clogging of inkjet recording heads, 0.005% by mass to 20% by mass to the total amount of the resultant ink, with the range of 0.05% by mass to 15% by mass being more preferable.

Also, in order to prevent kogation from occurring, it is effective to adjust phosphorous concentration of the recording liquid. By adjusting the phosphorous concentration to 500 ppm or less, it is possible to effectively prevent occurrence of kogation even after long-time storage of the ink, and the ink exhibits stable ejection properties, making it possible to obtain high-quality images.

The mechanism that an ink having high phosphorous concentration promotes formation of kogation on a heater and rapidly reduces the ink ejection amount can be considered as follows. Inorganic phosphorous compounds in an ink are heated in nozzles by a heater, create compounds together with calcium which is eluted from wetted materials in the ink and/or in the nozzles or tank etc., and the compounds adhere to the heater surface. Compounds derived from phosphorous and calcium (calcium phosphate, hydroxyapatite, etc.) are very hard, poorly soluble and are neither re-dispersed nor peeled off. Therefore, it is considered that once the compounds adhere onto a heater, burnt deposits of the pigment ink which have been peeled off or re-dispersed by the effect of cavitation increasingly adhere onto the heater, and whereby burnt deposits of carbon, which would be unlikely to occur when the burnt phosphorus residues do not exist, are produced at an accelerating pace to inhibit foaming of the recording liquid, resulting in a rapid reduction in ejection amount of the recording liquid. The reason why the adhesion of burnt carbon deposits is promoted by a small amount of burnt calcium deposits is not clear, but it is presumed because minute convexo-concave portions are caused on a surface of a heater by the adhesion of burnt deposits of phosphorous and calcium, and burnt carbon deposits get into the concave portions.

<Inkjet Recording Apparatus>

Hereinbelow, a recording liquid cartridge housing a recording liquid of the present invention, and an inkjet recording apparatus equipped with a recording liquid cartridge will be described with reference to the accompanying drawings. However, the following describes a configuration of an inkjet recording apparatus and a configuration of a recording liquid cartridge, and should not be construed as limiting the present invention in any way.

FIG. 1 is a schematic front view exemplarily showing a configuration of a mechanical unit of a serial type inkjet recording apparatus mounted with an ink cartridge accommodating therein a recording liquid of the present invention.

The mechanical unit of the inkjet recording apparatus has side plates (1) and (2) at both sides thereof, and a main guide rod (3) and a secondary support guide rod (4) substantially horizontally extend between the side plates (1) and (2) and slidably support a carriage unit (5) in a main scanning direction. The carriage unit (5) has four heads (6) so that their ejection surfaces (nozzle surfaces) (6a) face downward. The four heads (6) discharge a yellow (Y) ink, magenta (M) ink, cyan (C) ink and black (Bk) ink, respectively. Further, the carriage unit (5) is loaded with four ink cartridges (7y), (7m), (7c) and (7k) above the heads (6) in an exchangeable manner, the ink cartridges serving as ink suppliers for feeding each of the color inks to the four heads (6).

The carriage unit (5) is connected to a timing belt (11) which is spanned between a driving pulley (driving timing pulley) (9) and a driven pulley (idler pulley) (10), and the driving pulley (9) is rotated by a main scanning motor (8). The carriage unit (5), namely the four heads (6), is designed to move in the main scanning direction by driving and controlling the main scanning motor (8).

Subframes (13) and (14) are vertically arranged on a base plate (12) connecting between the side plates (1) and (2). Between the Subframes (13) and (14) is rotatably held a conveyance roller (15) for conveying a paper (16) in a secondary scanning direction perpendicular to the main to scanning direction. A secondary scanning motor (17) is arranged on the side of the Subframe (14). To transmit the rotation of the secondary scanning motor (17) to the conveyance roller (15), a gear (18) is fixed to the rotation shaft of the secondary scanning motor (17), and another gear (19) is fixed to the shaft of the conveyance roller (15).

Further, a mechanism (21) for maintaining and improving reliability of the heads (6) (hereinafter referred to as "subsystem") is arranged between the side plate (1) and the subframe (13). The subsystem (21) is configured in the following manner. Four-cap means (22) for capping ejection surfaces of the heads (6) is held by a holder (23). The holder (23) is rockably held by a link member (24). When the carriage unit (5) moves in the main scanning direction and comes in contact with a catching part (25) arranged on the holder (23), the holder (23) is lifted up to thereby allow the capping means (22) to cap the ejection surfaces (6a) of the ink-jet heads (6). When the carriage unit (5) moves toward a printing area, the holder (23) is lifted down to thereby allow the cap means (22) to depart from the ejection surfaces (6a) of the ink-jet heads (6).

Each of the cap means (22) is connected to a suction pump (27) via a suction tube (26), has an air release port and hereby communicates to the air via an air release tube and an air release valve. The suction pump (27) aspirates a waste liquid and discharges the same to a waste reservoir (not shown) typically via a drain tube.

A wiper blade (28) is fixed to a blade arm (29) at the side of the holder (23). The wiper blade (28) is wiping means for wiping the ejection surfaces (6a) of the ink-jet heads (6) and is composed of a fibrous material, foaming material or elastic material such as rubber. The blade arm (29) is rockably pivoted and is rocked by the rotation of a cam which is rotated by a driving means (not shown).

Figure 2:
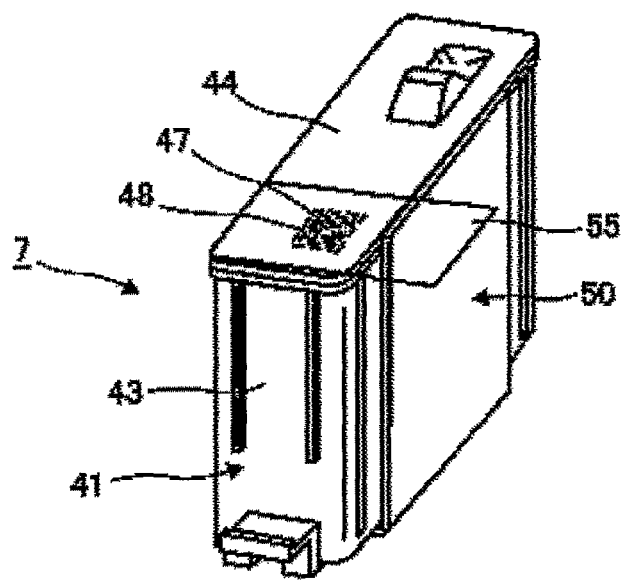
FIG. 2 is a perspective external view of an ink cartridge before being mounted to a recording apparatus.

The ink cartridge (7) will be illustrated below with reference to FIGS. 2 and 3. FIG. 2 is an external perspective view of an ink cartridge before loaded to a recording apparatus, and FIG. 3 is a front cross-sectional view of the ink cartridge.

Figure 3:
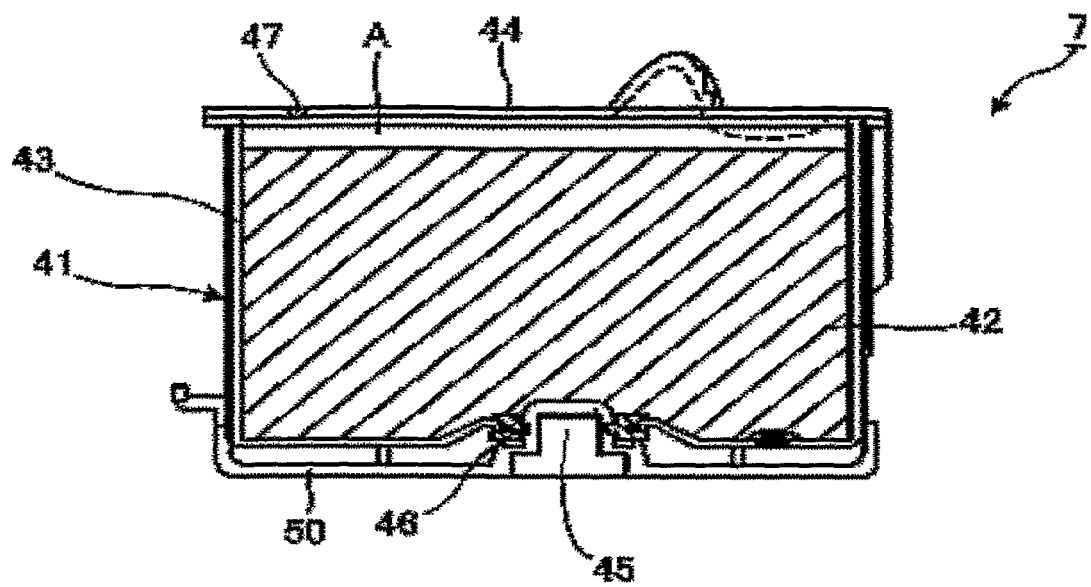
FIG. 3 is a front cross-sectional view of an ink cartridge.

With reference to FIG. 3, an ink cartridge (7) has a cartridge main body (41) housing an ink absorber (42) which absorbs an ink of predetermined color. The cartridge main body (41) is made of typically a resinous molded article and is composed of a case (43) having a wide opening on its top and an upper lid member (44) bonded or melt-fixed to the top opening. The ink absorber (42) is composed of a porous material such as a urethane foam, is compressed and inserted into the cartridge main body (41) before absorbing the ink.

The case (43) of the cartridge main body (41) has an ink supply port (45) at its bottom for supplying the ink to the recording head (6), and a sealing ring (46) is engaged to the inner wall of the ink supply port (45). The upper lid member (44) has an air release port (47).

The cartridge main body (41) has a capping member (50). The capping member (50) serves to cover the ink supply port (45) before loading of the cartridge and to prevent the inside ink from leaking when the cartridge is handled typically in loading, transporting or vacuum-packaging and a pressure is applied to the wide side walls to thereby compress and deform the case (43).

With reference to FIG. 2, the air release port (47) has a film sealing member (55) having an oxygen permeability of 100 mL/m² or more affixed to the upper lid member (44) to seal the same. The sealing member (55) has such a size as to cover and seal the air release port (47) as well as plural grooves (48) arranged around the air release port (47). The air release port (47) is thus sealed by the sealing member (55) having an oxygen permeability of 100 mL/m² or more, and in addition, the ink cartridge (7) is packaged under reduced pressure with a packaging member such as a gas-impermeable aluminum laminated film. This configuration can increase the deaeration of the ink even if the ink contains dissolved gas due to the air contaminated during ink charging or the air in a space (A) (FIG. 3) formed between the ink absorber (42) and the cartridge main body (41), since the air in the ink is is exhausted to a highly vacuum space between the cartridge main body (41) and the outer packaging member via the sealing member (55).

Figure 4:
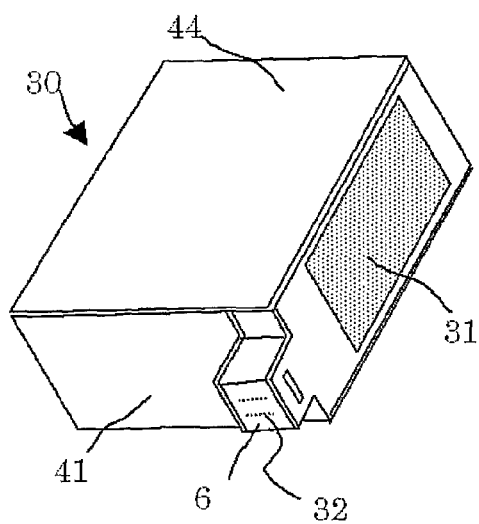
FIG. 4 is a perspective external view of a recording unit which is integrally supported with a recording head.

FIG. 4 illustrates a configuration of a recording cartridge having a recording liquid container housing the recording liquid of the present invention, and a head unit for ejecting droplets of the recording liquid.

More specifically, a recording unit (30) is a serial type recording unit and mainly consists of an ink-jet head (6), an ink tank (41) housing the recording liquid to be supplied to the ink-jet head (6), and a lid member sealing the ink tank (41). The ink-jet head (6) has a plurality of nozzles (32) for ejecting the recording liquid. The recording liquid is fed from the ink tank (41) via an ink supply tube (not shown) to a common chamber (not shown) and is ejected from the nozzles (32) according to an electric signal inputted through an electrode (31) from the recording apparatus main body. The recording unit of this type has a structure suitable for a "thermal" or "bubble" head driven by action of heat energy. This type of head can be prepared at low cost.

The serial ink-jet recording apparatus is taken as an example in the above description, but the recording liquid of the present invention can also be applied to a recording apparatus having a "line head", in which nozzles and other components are integrated at a density of equal to or one severalths the resolution of the target image in an optional arrangement such as staggered arrangement and in a width larger than that of a recording medium used.

The "recording apparatus" used herein may be an output printer for personal computers or digital cameras, as well as an apparatus having composite functions in combination with, for example, facsimile, scanner and/or telephone.

EXAMPLES

Hereinafter, the present invention will be described in detail referring to specific Examples and Comparative Examples, however, the present invention is not limited to the disclosed Examples. On the contrary, the present invention is intended to cover various modifications and equivalent arrangements included within the spirit and scope of the appended claims.

(Preparation of Pigment Dispersoid)
<Solid Solution Pigment-Containing Dispersoid A1>

| | |
|---|---|
| CINQUASIA Scarlet RT-766 [C.I. Pigment Red 207] (a solid solution formed between an unsubstituted quinacridone [C.I. Pigment Violet 19] and 4,11-dichloroquinacridone produced by Chiba Specialty Chemicals K.K.) | 15 parts by mass |
| DISPERBYK-2010 (acrylic polymer dispersant produced by BYK Japan K.K.) | 5 parts by mass |
| ion exchanged water | 80 parts by mass |

A DYNO MILL KDL A-model (manufactured by WAB Co., Ltd.) serving as a kneader can be charged with a zirconia bead of 0.5 mm in diameter. The above materials can be mixed and agitated, and the mixture can be poured into the kneader, followed by kneading for 90 minutes at 2,000 rpm to obtain a mill base. The mill base thus obtained can be taken out from the kneader and filtered through a filter having a pore size of 1 μm, thereby obtaining a solid solution pigment-containing dispersoid A1.

<Lake Pigment Dispersoid B1>

A lake pigment dispersoid B1 can be prepared in a similar manner to that used for the solid solution pigment-containing dispersoid A1 except that the pigment is replaced with FANAL Violet 6060 (methyl violet phosphomolybdic-tungstic acid lake [C.I. Pigment Violet 3] produced by BASF Japan Co., Ltd.).

<Solid Solution Pigment-Containing Dispersoid A2>

A solid solution pigment-containing dispersoid A2 can be prepared in a similar manner to that used for the solid solution pigment-containing dispersoid A1 except that the pigment is replaced with CROMOPHTAL Jet Magenta 2BC (a solid solution formed between an unsubstituted quinacridone [C.I. Pigment Violet 19] and a dimethylquinacridone [C.I. Pigment Red 122] produced by Chiba Specialty Chemicals K.K.).

<Lake Pigment Dispersoid B2>

A lake pigment dispersoid B2 can be prepared in a similar manner to that used for the solid solution pigment-containing dispersoid A1 except that the pigment is replaced with FANAL Violet 4830 (Rhodamine 6G sulfur/molybdenum acid lake [C.I. Pigment Red 81:2] produced by BASF Japan Co., Ltd.).

<Solid Solution Pigment-Containing Dispersoid A3>

| | |
|---|---|
| CINQUASIA Scarlet RT-766 [C.I. Pigment Red 207] (a solid solution formed between an unsubstituted quinacridone [C.I. Pigment Violet 19] and 4,11-dichloroquinacridone produced by Chiba Specialty Chemicals K.K.) | 15 parts by mass |
| JONCRYL 586 (styrene acrylic polymer produced by BASF Japan Co., Ltd.) | 15 parts by mass |
| 2-amino-2-methyl-1,3 propanediol | 1 part by mass |
| ion exchanged water | 69 parts by mass |

JONCRYL 586 and 2-amino-2-methyl-1,3 propanediol can be added to ion exchanged water so as to be dissolved to obtain a mixture solution, CINQUASIA Scarlet RT-766 can be added to the mixture solution and sufficiently wetted. Into a DYNO MILL KDL A-model (manufactured by WAB Co., Ltd.) serving as a kneader which can be charged with a zirconia bead of 0.5 mm in diameter, the wetted components can be kneaded for 40 minutes at 2,000 rpm to obtain a mill base. To the obtained mill base, 3 parts by mass of 1N hydrochloric acid can be added and agitated, and 400 parts by mass of ion exchanged water can be added thereto and sufficiently agitated. The mixture solid solution thus obtained can be subjected to centrifugal separation using a centrifuge to separate a pigment paste from water, and then supernatant liquid can be removed from the pigment paste. This procedure can be repeated several times. To the resultant pigment paste, 1.0 part by mass of 2-amino-2-methyl-1,3 propanediol can be added as a basic compound, and the pigment paste can be kneaded again using DYNO MILL KDL A model to obtain a mill base. The mill base thus obtained can be taken out from the kneader and filtrated through a filter having a pore size of 1 μm, thereby obtaining a solid solution pigment-containing dispersoid A3.

<Lake Pigment Dispersoid B3>

A lake pigment dispersoid B3 can be prepared in a similar manner to that used for the solid solution pigment-containing dispersoid A1 except that the pigment is replaced with FANAL Violet 5460 (Rhodamine B phosphomolybdic-tungstic acid lake [C.I. Pigment Violet 2] produced by BASF Japan Co., Ltd.).

<Solid Solution Pigment-Containing Dispersoid A4>

A solid solution pigment-containing dispersoid A4 can be prepared in a similar manner to that used for the solid solution pigment-containing dispersoid A1 except that the pigment is replaced with CROMOPHTAL Jet Magenta 2BC (a solid solution formed between an unsubstituted quinacridone [C.I. Pigment Violet 19] and a dimethylquinacridone [C.I. Pigment Red 122] produced by Chiba Specialty Chemicals K.K.), and the dispersant is replaced with a dispersant represented by Formula (2A).

<Lake Pigment Dispersoid B4>

A lake pigment dispersoid B4 was prepared in a similar manner to that used for the solid solution pigment-containing dispersoid A1 except that the pigment was replaced with FANAL Violet 5480 (Rhodamine B is phosphomolybdic acid lake [C.I. Pigment Violet 1] produced by BASF Japan Co., Ltd.) and the dispersant was replaced with a dispersant represented by Formula (2A).

<Solid Solution Pigment-Containing Dispersoid A5>

A solid solution pigment-containing dispersoid A5 can be prepared in a similar manner to that used for the solid solution pigment-containing dispersoid A1 except that the pigment is replaced with CROMOPHTAL Jet Magenta 2BC (a solid solution formed between an unsubstituted quinacridone [C.I. Pigment Violet 19] and a dimethylquinacridone [C.I. Pigment Red 122] produced by Chiba Specialty Chemicals K.K.), and the dispersant is replaced with a dispersant represented by Formula (2B).

<Lake Pigment Dispersoid B5>

A lake pigment dispersoid B5 can be prepared in a similar manner to that used for the solid solution pigment-containing dispersoid A1 except that the pigment is replaced with FANAL Violet 5480 (Rhodamine B phosphomolybdic acid lake [C.I. Pigment Violet 1] produced by BASF Japan Co., Ltd.) and the dispersant is replaced with a dispersant represented by Formula (2B).

<Solid Solution Pigment-Containing Dispersoid A6>

A solid solution pigment-containing dispersoid A6 can be prepared in a similar manner to that used for the solid solution pigment-containing dispersoid A1 except that the pigment is replaced with CINQUASIA Scarlet RT-766 [C.I. Pigment Red 207] (a solid solution formed between an unsubstituted quinacridone [C.I. Pigment Violet 19] and 4,11-dichloroquinacridone produced by Chiba Specialty Chemicals K.K.), and the dispersant is replaced with a dispersant represented by Formula (1A).

<Lake Pigment Dispersoid B6>

A lake pigment dispersoid B6 was prepared in a similar manner to that used for the solid solution pigment-containing dispersoid A1 except that the pigment was replaced with FANAL Violet 5460 (Rhodamine B phosphomolybdic-tungstic acid lake [C.I. Pigment Violet 2] produced by BASF Japan Co., Ltd.), and the dispersant was replaced with a dispersant represented by Formula (1A).

<Solid Solution Pigment-Containing Dispersoid A7>

A solid solution pigment-containing dispersoid A7 was prepared in a similar manner to that used for the solid solution pigment-containing dispersoid A1 except that the pigment was replaced with CROMOPHTAL Jet Magenta 2BC (a solid solution formed between an unsubstituted quinacridone [C.I. Pigment Violet 19] and a dimethylquinacridone [C.I. Pigment Red 122] produced by Chiba Specialty Chemicals K.K.), and the dispersant was replaced with a dispersant represented by Formula (1B).

<Lake Pigment Dispersoid B7>

A lake pigment dispersoid B7 was prepared in a similar manner to that used for the solid solution pigment-containing dispersoid A1 except that the pigment was replaced with FANAL Violet 5480 (Rhodamine B phosphomolybdic acid lake [C.I. Pigment Violet 1] produced by BASF Japan Co., Ltd.) and the dispersant was replaced with a dispersant represented by Formula (1B).

<Pigment Dispersoid C1>

A pigment dispersoid C1 containing no solid solution pigment and having no visible light absorption peak at a wavelength between 510 nm to 530 nm and between 540 nm to 560 nm can be prepared in a similar manner to that used for the solid solution pigment-containing dispersoid A1 except that the pigment is replaced with INK JET Magenta E02 VP2621 (dimethylquinacridone [C.I. Pigment Red 122] produced by Clariant Japan K.K.), and the dispersant is replaced with a dispersant represented by Formula (1A).

<Pigment Dispersoid C2>

A pigment dispersoid C2 containing no lake pigment (B) can be prepared in a similar manner to that used for the solid solution pigment-containing dispersoid A1 except that the pigment is replaced with INK JET Magenta E5B02 VP2984 (an unsubstituted quinacridone γ-phase [C.I. Pigment Violet 19] produced by Clariant Japan K.K.), and the dispersant is replaced with a dispersant represented by Formula (1B).

Example 1

| | |
|---|---|
| Solid solution pigment-containing dispersoid A1 | 18 parts by mass |
| Lake pigment dispersoid B1 | 27 parts by mass |
| urea | 12 parts by mass |
| N-methyl-2-pyrrolidone | 12 parts by mass |
| 3-methyl-2,4-heptanediol | 2 parts by mass |
| surfactant represented by General Formula (7) | 1 part by mass |
| triethanolamine | 0.2 parts by mass |
| PROXEL LV (anti-microbial agent produced by Avecia Ltd.) | 0.1 parts by mass |
| ion exchanged water | 27.7 parts by mass |

Among the above components, urea, N-methyl-2-pyrrolidone, 3-methyl-2,4-heptanediol, the surfactant represented by General Formula (7), triethanolamine and PROXEL LV can be dissolved in ion exchanged water to prepare a vehicle, the vehicle can be mixed with the solid solution pigment-containing dispersoid A1 and the lake pigment dispersoid B1, and the mixture liquid can be filtered through a filter having a pore size of 1 µm, thereby obtaining a magenta recording ink.

Example 2

| | |
|---|---|
| Solid solution pigment-containing dispersoid A2 | 9 parts by mass |
| Lake pigment dispersoid B2 | 36 parts by mass |
| glycerin | 8 parts by mass |
| 2-pyrrolidone | 16 parts by mass |
| 2,2,4-trimethyl-1,3-pentanediol | 2 parts by mass |
| surfactant represented by General Formula (8) | 1 part by mass |
| 2-amino-2-methyl-1,3 propanediol | 0.2 parts by mass |
| PROXEL LV (anti-microbial agent produced by Avecia Ltd.) | 0.1 parts by mass |
| ion exchanged water | 27.7 parts by mass |

The above ink formulation can be used in a similar manner to that of Example 1, thereby obtaining a magenta to recording ink of Example 2.

Example 3

| | |
|---|---|
| Solid solution pigment-containing dispersoid A3 | 18 parts by mass |
| Lake pigment dispersoid B3 | 27 parts by mass |
| glycerin | 11 parts by mass |
| diethylene glycol monobutyl ether | 22 parts by mass |
| surfactant represented by General Formula (7) | 1 part by mass |
| lithium hydroxide | 0.2 parts by mass |
| PROXEL LV (anti-microbial agent produced by Avecia Ltd.) | 0.1 parts by mass |
| ion exchanged water | 20.7 parts by mass |

The above ink formulation can be used in a similar manner to that of Example 1, thereby obtaining a magenta recording ink of Example 3.

Example 4

| | |
|---|---|
| Solid solution pigment-containing dispersoid A3 | 35 parts by mass |
| Lake pigment dispersoid B4 | 10 parts by mass |
| glycerin | 10 parts by mass |
| propylene glycol | 20 parts by mass |
| 2,2,4-trimethyl-1,3-pentanediol | 2 parts by mass |
| surfactant represented by General Formula (7) | 1 part by mass |
| PROXEL LV (anti-microbial agent produced by Avecia Ltd.) | 0.1 parts by mass |
| ion exchanged water | 21.9 parts by mass |

The above ink formulation can be used in a similar manner to that of Example 1, thereby obtaining a magenta recording ink of Example 4.

Example 5

| | |
|---|---|
| Solid solution pigment-containing dispersoid A4 | 30 parts by mass |
| Lake pigment dispersoid B5 | 15 parts by mass |
| glycerin | 5 parts by mass |
| propylene glycol | 15 parts by mass |
| 3-methyl-2,4-heptanediol | 2 parts by mass |
| surfactant represented by General Formula (8) | 1 part by mass |
| triethanolamine | 0.2 parts by mass |

-continued

| | |
|---|---|
| PROXEL LV (anti-microbial agent produced by Avecia Ltd.) | 0.1 parts by mass |
| ion exchanged water | 31.7 parts by mass |

The above ink formulation can be used in a similar manner to that of Example 1, thereby obtaining a magenta to recording ink of Example 5.

Example 6

| | |
|---|---|
| Solid solution pigment-containing dispersoid A5 | 30 parts by mass |
| Lake pigment dispersoid B6 | 15 parts by mass |
| glycerin | 10 parts by mass |
| 1,6-hexanediol | 20 parts by mass |
| 3-methyl-2,4-heptanediol | 2 parts by mass |
| PESRESIN A-520 (water-soluble polyester resin, weight average molecular mass = 14,000, solid content = 30%, produced by Takamatsu Yushi K.K.) | 2 parts by mass |
| surfactant represented by General Formula (9) | 1 part by mass |
| triethanolamine | 0.2 parts by mass |
| PROXEL LV (anti-microbial agent produced by Avecia Ltd.) | 0.1 parts by mass |
| ion exchanged water | 19.7 parts by mass |

The above ink formulation can be used in a similar manner to that of Example 1, thereby obtaining a magenta recording ink of Example 6.

Example 7

| | |
|---|---|
| Solid solution pigment-containing dispersoid A6 | 27 parts by mass |
| Lake pigment dispersoid B4 | 18 parts by mass |
| glycerin | 15 parts by mass |
| 3-methyl-1,3-butanediol | 15 parts by mass |
| JC-05 (styrene-acrylic acid copolymer, weight average molecular mass = 20,000, solid content = 21%, produced by Seiko PMC Co.) | 7 parts by mass |
| PDX-7630A (acrylic microparticles-containing aqueous dispersoid, volume average particle diameter = 160 nm, solid content = 32%, produced by BASF Japan Co., Ltd.) | 7 parts by mass |
| 2,2,4-trimethyl-1,3-pentanediol | 2 parts by mass |
| surfactant represented by General Formula (8) | 1 part by mass |
| 2-amino-2-methyl-1,3 propanediol | 0.2 parts by mass |
| PROXEL LV (anti-microbial agent produced by Avecia Ltd.) | 0.1 parts by mass |
| ion exchanged water | 7.7 parts by mass |

The above ink formulation can be used in a similar manner to that of Example 1, thereby obtaining a magenta recording ink of Example 7.

Example 8

| | |
|---|---|
| Solid solution pigment-containing dispersoid A7 | 30 parts by mass |
| Lake pigment dispersoid B7 | 15 parts by mass |
| glycerin | 15 parts by mass |
| 1,3-butanediol | 15 parts by mass |
| surfactant represented by General Formula (9) | 1 part by mass |
| JC-05 (styrene-acrylic acid copolymer, weight average molecular mass = 20,000, solid content = 21%, produced by Seiko PMC Co.) | 5 parts by mass |
| JONCRYL 632 (acrylic microparticles-containing aqueous dispersoid, volume average particle diameter = 100 nm, solid content = 42%, produced by BASF Japan Co., Ltd.) | 7 parts by mass |
| 3-methyl-2,4-heptanediol | 2 parts by mass |
| 2-amino-2-methyl-1,3 propanediol | 0.2 parts by mass |
| PROXEL LV (anti-microbial agent produced by Avecia Ltd.) | 0.1 parts by mass |
| ion exchanged water | 9.7 parts by mass |

The above ink formulation was used in a similar manner to that of Example 1, thereby obtaining a magenta recording ink of Example 8.

Example 9

A magenta recording ink of Example 9 can be produced using a similar ink formulation to that which can be used in Example 7 and in a similar manner to that of Example 7 except that the same coloring materials as used in Example 1 (the solid solution pigment-containing dispersoid A1 and lake pigment dispersoid B1) are used.

Example 10

A magenta recording ink of Example 10 can be produced using a similar ink formulation to that which can be used in Example 7 and in a similar manner to that of Example 7 except that the same coloring materials as used in Example 3 (the solid solution pigment-containing dispersoid A3 and lake pigment dispersoid B3) are used.

Example 11

A magenta recording ink of Example 11 can be produced using a similar ink formulation to that which can be used in Example 7 and in a similar manner to that of Example 7 except that the same coloring materials as used in Example 6 (the solid solution pigment-containing dispersoid A5 and lake pigment dispersoid B6) are used.

Comparative Example 1

A magenta recording ink of Comparative Example 1 can be produced in a similar manner to that of Example 2 except that the solid solution pigment-containing dispersoid A2 is used in an amount of 5 parts by mass, and the lake pigment dispersoid B2 was used in an amount of 40 parts by mass.

Comparative Example 2

A magenta recording ink of Comparative Example 2 can be produced in a similar manner to that of Example 8 except that the solid solution pigment-containing dispersoid A7 are used in an amount of 42 parts by mass, and the lake pigment dispersoid B7 is used in an amount of 3 parts by mass.

Comparative Example 3

A magenta recording ink of Comparative Example 3 can be produced in a similar manner to that of Example 7 except that the solid solution pigment-containing dispersoid A6 is replaced with the pigment dispersoid C1.

Comparative Example 4

A magenta recording ink of Comparative Example 4 can be produced in a similar manner to that of Example 7 except that the solid solution pigment-containing dispersoid A6 is replaced with the pigment dispersoid C2 and the lake pigment dispersoid is not added in the ink formulation.

Figure 5:
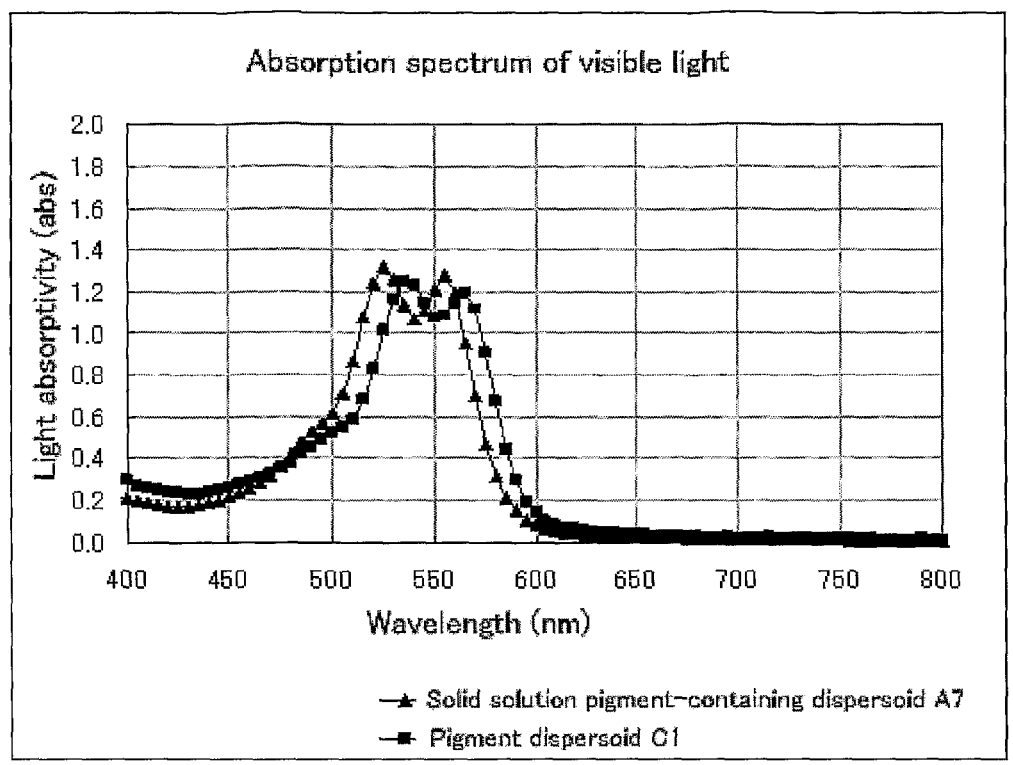
FIG. 5 is a view showing visible light spectrum.

A mass ratio (B/A) of the lake pigment (B) to the solid solution pigment (A) and visible light absorption peak values (at a wavelength 1 and a wavelength 2) of the solid solution pigment (A) in Examples and Comparative Examples are predicted (except Example 8 and Comparative Example 5) in Table 1. The visible light absorption spectrum can be measured using a spectrophotometer (U-3310, manufactured by Hitachi Ltd.) can be used. Since the concentration of the undiluted solution pigment dispersoid used in the present invention may be excessively high, the solution pigment dispersoid can be diluted 4,000 times with pure water and then put it in a measurement cell of the spectrophotometer. Meanwhile, pure water can be put in a reference cell. Then, the cells can be scanned with visible light of at least a wavelength range of from 340 nm to 800 nm at sampling intervals of 5 nm or less to obtain a light absorption spectrum of the undiluted solution pigment dispersoid. FIG. 5 predicts visible light absorption spectrum of the solid solution pigment-containing dispersoid A7 and the pigment dispersoid C2. The resulting spectrum predicts that the solid solution pigment-containing dispersoid A7 has major light absorption peaks at wavelengths of 525 nm and 555 nm and the pigment dispersoid C2 has major light absorption peaks at wavelengths of 540 nm and 565 nm.

Comparative Example 5

A magenta recording ink of Comparative Example 5 was produced in a similar manner to that of Example 7 except that the solid solution pigment-containing dispersoid A6 was not added to the ink formulation, and the lake pigment dispersoid B4 was used in an amount of 45 parts by mass.

Measurement results of viscosity, surface tension and pH value of the inks predicted in Examples and Comparative Examples are described in Table 2. These physical property values can be measured by the following methods (and were actually measured in this manner in the case of Example 8 and Comparative Example 5), respectively.

(1) Viscosity

The viscosity of each of the inks can be measured using a viscometer, RC-500 manufactured by TOKI SANGYO CO., LTD., at a temperature of 25° C.

(2) Surface Tension

The surface tension of each of the inks can be measured using a surface tensiometer, CBVP-Z model manufactured by Kyowa Interface Science Co., LTD., at a temperature of 25° C.

(3) pH

The pH value of each of the inks can be measured using a pH measuring device, BOY-P2 manufactured by Shindengen Electric Manufacturing Co., Ltd., at a temperature of 25° C.

TABLE 2

| Ink | (1) Viscosity (m · Ps) | (2) Surface tension (mN/m) | (3) pH |
|---|---|---|---|
| Ex. 1 | 6.2 | 32.5 | 7.8 |
| Ex. 2 | 5.5 | 28.9 | 8.1 |
| Ex. 3 | 12.0 | 35.2 | 7.5 |
| Ex. 4 | 7.0 | 33.1 | 6.8 |
| Ex. 5 | 4.1 | 27.8 | 7.9 |
| Ex. 6 | 21.0 | 25.5 | 8.7 |
| Ex. 7 | 10.5 | 26.9 | 8.1 |
| Ex. 8 | 7.5 | 24.7 | 9.1 |
| Ex. 9 | 9.5 | 27.6 | 8.2 |
| Ex. 10 | 9.9 | 27.2 | 7.9 |
| Ex. 11 | 8.7 | 27.5 | 8.6 |

TABLE 1

| Ink | Mass ratio (B/A) | Solid solution pigment-containing dispersoid (A) | | | Lake pigment (B) | |
|---|---|---|---|---|---|---|
| | | Dispersoid | Composition of pigment | Wavelength 1 | Wavelength 2 | Dispersoid | Composition of pigment |
| Ex. 1 | 1.50 | A1 | PR207 | 520 nm | 550 nm | B1 | PV3 |
| Ex. 2 | 4.00 | A2 | PR122/PV19 | 525 nm | 555 nm | B2 | PV81:2 |
| Ex. 3 | 1.50 | A3 | PR207 | 520 nm | 550 nm | B3 | PV2 |
| Ex. 4 | 0.29 | A3 | PR207 | 520 nm | 550 nm | B4 | PV2 |
| Ex. 5 | 0.50 | A4 | PR122/PV19 | 525 nm | 555 nm | B5 | PV1 |
| Ex. 6 | 0.50 | A5 | PR122/PV19 | 525 nm | 555 nm | B6 | PV1 |
| Ex. 7 | 0.67 | A6 | PR207 | 520 nm | 550 nm | B4 | PV2 |
| Ex. 8 | 0.50 | A7 | PR122/PV19 | 525 nm | 555 nm | B7 | PV1 |
| Ex. 9 | 1.50 | A1 | PR207 | 520 nm | 550 nm | B1 | PV3 |
| Ex. 10 | 1.50 | A3 | PR207 | 520 nm | 550 nm | B3 | PV2 |
| Ex. 11 | 0.50 | A5 | PR122/PV19 | 525 nm | 555 nm | B6 | PV1 |
| Compara. Ex. 1 | 8.00 | A2 | PR122/PV19 | 525 nm | 555 nm | B2 | PV81:2 |
| Compara. Ex. 2 | 0.07 | A7 | PR122/PV19 | 525 nm | 555 nm | B7 | PV1 |
| Compara. Ex. 3 | B/[A'] = 0.67 | C1 | [A'] = PR122 | 540 nm | 565 nm | B4 | PV2 |
| Compara. Ex. 4 | 0.00 | C2 | [A"] = PV19 | 520 nm | 555 nm | — | — |
| Compara. Ex. 5 | ∞ | — | — | — | — | B4 | PV2 |

TABLE 2-continued

| Ink | (1) Viscosity (m · Ps) | (2) Surface tension (mN/m) | (3) pH |
|---|---|---|---|
| Compara. Ex. 1 | 5.9 | 28.5 | 8.5 |
| Compara. Ex. 2 | 7.8 | 25.1 | 8.9 |
| Compara. Ex. 3 | 9.8 | 27.0 | 8.0 |
| Compara. Ex. 4 | 9.8 | 28.3 | 7.5 |
| Compara. Ex. 5 | 10.2 | 27.5 | 8.5 |

(Evaluation of Ejection Stability)

Each of the recording inks produced in Examples and Comparative Examples can be charged to an inkjet printer, IPSIO GX5000 manufactured by Ricoh Company Ltd., and the printer can be set to a sleep mode where primarily capping and cleaning functions are inoperable during the printing operation to determine how long time, in seconds, would elapse until a deviation of the direction of jetting liquid droplets from a predetermined direction occurs or how long time, in seconds, would elapse until the weight of ejection liquid droplets changes. Based on the predicted time length results, the reliability of ejection stability of each of the inks can be evaluated in accordance with the following criteria. Table 3 predicts the evaluation results.

<Evaluation Criteria>
A: 600 seconds or longer
B: 300 seconds or longer and shorter than 600 seconds
C: 60 seconds or longer and shorter than 300 seconds
D: shorter than 60 seconds <Printing Test>

Each of the recording inks predicted in Examples and Comparative Examples can be charged to an inkjet printer, IPSIO GX5000 manufactured by Ricoh Company Ltd., and a solid image can be printed in one pass. As printing test papers, the following regular papers and exclusive recording papers can be used.

Regular Paper:
MY PAPER SA (manufactured by NBS Ricoh Co., Ltd.)
XEROX4024 (manufactured by FUJI XEROX OFFICE SUPPLY CO., LTD.)
PB Paper (manufactured by Canon Inc.)

Exclusive Recording Paper:
PROFESSIONAL PHOTO PAPER PR-101 (manufactured by Canon Inc.)
PREMIUM PLUS PHOTO PAPER (gloss paper) (manufactured by Hewlett-Packard Co.)

(Evaluation of Hue Angle)

After drying the printed image, a hue angle of each of the ink printed can be measured using a reflective/color spectrophotometric densitometer (manufactured by X-Rite Co.). More specifically, a value of hue angle of the printed image on each printing test paper can be measured, and an average value obtained from hue angle values on the three types of regular paper for the printing test and an average value obtained from hue angle values on the two types of gloss paper for the printing test can be calculated. Afterward, a difference between each of the average values to the value of hue angle (Magenta color: 356.31°) of the standard color (Japan color Ver. 2) can be determined. Table 3 predicts the resultant hue angle grades obtained from the absolute values according to the following evaluation criteria.

<Evaluation Criteria>
A: The difference was 2° or less.
B: The difference was 2° or more and less than 5°.
C: The difference was 5° or more and less than 10°.
D: The difference was 10° or more.

(Evaluation of Chroma)

A chroma value of each of the ink image printed above can be measured using the reflective/color spectrophotometric densitometer (manufactured by X-Rite Co.). More specifically, a chroma value of the printed image on each printing test paper can be measured, and an average value obtained from chroma values on the three types of regular paper for the printing test and an average value obtained from chroma values on the two types of gloss paper for the printing test can be calculated. Afterward, the ratio of the average chroma value to the chroma value (Magenta color: 74.55) of the standard color (Japan color Ver. 2) can be determined. Table 3 predicts the resultant grades obtained according to the following evaluation criteria.

<Evaluation Criteria>
A: 0.95 or more
B: 0.85 or more and less than 0.95
C: 0.75 or more and less than 0.85
D: less than 0.75

(Evaluation of Abrasion Resistance)

An ink printed portion of an image sample that can be formed on each of the above-mentioned gloss papers in a similar method to the chroma measurement can be abraded back and forth 5 times with white cotton cloth under a load of 900 g using a clock meter CM-1 (manufactured by TOYO SEIKI Co., Ltd.). The results of the abrasion resistance (an average value obtained on the two types of exclusive recording papers, i.e. gloss papers) can be evaluated according to the following criteria. Table 3 predicts the evaluation results.

<Evaluation Criteria>
A: No image drop-out was visually observed, and no contamination was visually observed around the formed image.
B: Almost no image drop-outs were observed, and a slight amount of contamination was observed around the formed image, on visual basis.
C: The formed image had little image drop-out, but contamination was observed around the formed image, on visual basis.
D: The formed image had a significant amount of image drop-outs, and a significant amount of contamination was observed around the formed image, on visual basis.

TABLE 3

| | | Hue angle | | Chroma | | Abrasion |
|---|---|---|---|---|---|---|
| Ink | Ejection Stability | Regular paper | Exclusive paper | Regular paper | Exclusive paper | resistance |
| Ex. 1 | B | B | A | B | A | B |
| Ex. 2 | A | B | A | B | A | A |
| Ex. 3 | B | A | A | A | A | A |
| Ex. 4 | A | A | A | B | A | A |
| Ex. 5 | A | A | A | A | A | B |
| Ex. 6 | B | A | A | A | A | A |
| Ex. 7 | A | A | A | B | A | A |
| Ex. 8 | A | A | A | A | A | A |
| Ex. 9 | B | B | A | B | B | A |
| Ex. 10 | A | B | A | B | A | A |
| Ex. 11 | A | A | A | A | A | A |
| Compara. Ex. 1 | C | D | C | C | B | B |
| Compara. Ex. 2 | B | D | C | C | B | A |

TABLE 3-continued

| Ink | Ejection Stability | Hue angle Regular paper | Hue angle Exclusive paper | Chroma Regular paper | Chroma Exclusive paper | Abrasion resistance |
|---|---|---|---|---|---|---|
| Compara. Ex. 3 | B | C | C | B | A | A |
| Compara. Ex. 4 | A | D | D | B | A | A |
| Compara. Ex. 5 | A | D | C | A | A | A |

The invention claimed is:

1. A magenta recording ink composition, comprising:
a solid solution pigment (A) comprising quinacridone;
a lake pigment (B) having a xanthene structure;
an aqueous solvent; and
water,
wherein the solid solution pigment (A) has visible light absorption peaks at wavelength ranges of from 510 nm to 530 nm and from 540 nm to 560 nm,
wherein a mass ratio (B/A) of the lake pigment (B) to the solid solution pigment (A) falls within the range of 0.1 to 5, and
wherein each of the solid solution pigment (A) and the lake pigment (B) is dispersed with a dispersant of formula (1A)

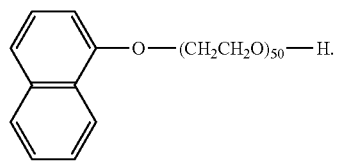

Formula (1A)

2. The composition of claim 1, wherein the solid solution pigment (A) is
a solid solution (a) comprising an unsubstituted quinacridone and a dimethylquinacridone,
a solid solution (b) comprising an unsubstituted quinacridone and a dichloroquinacridone, or
a mixture of (a) and (b), and
the lake pigment (B) is at least one of C.I. Pigment Violet 1 and C.I. Pigment Violet 2.

3. The composition of claim 1, wherein the aqueous solvent comprises at least one selected from the group consisting of glycerin, 1,3-butandiol, 3-methyl-1,3-butandiol, hexylene glycol, polyethylene glycol, polypropylene glycol, 1,5-pentanediol, 1,6-hexanediol, propylene glycol, dipropylene glycol, and trimethylolpropane.

4. The composition of claim 1, further comprising a water-soluble polymer having a weight average molecular mass of 2,000 to 50,000.

5. The composition of claim 1, further comprising polymer microparticles having a volume average particle diameter of 20 nm to 150 nm and/or a polymer emulsion comprising the microparticles.

6. The composition of claim 1, further comprising a polyol comprising 8 or more carbon atoms, or glycol ether comprising 8 or more carbon atoms.

7. The composition of claim 1, having
a viscosity of 5 mPa·s to 30 mPa·s at 25° C.;
a surface tension of 20 mN/m to 35 mN/m; and
a pH of 7 to 11.

8. An inkjet recording method of inkjet recording, the method comprising:
printing an ink on a recording medium by making the composition of claim 1 adhere on the recording medium.

9. The method of claim 8, wherein the printing is performed such that the ink is ejected by the action of mechanical energy transmitted to the ink.

10. A recorded matter, comprising:
an image formed by an inkjet recording method,
wherein the inkjet recording method comprises printing an ink on a recording medium by making the composition of claim 1 adhere on the recording medium.

11. The composition of claim 2, wherein the aqueous solvent comprises at least one selected from the group consisting of glycerin, 1,3-butandiol, 3-methyl-1,3-butandiol, hexylene glycol, polyethylene glycol, polypropylene glycol, 1,5-pentanediol, 1,6-hexanediol, propylene glycol, dipropylene glycol, and trimethylolpropane.

12. The composition of claim 2, further comprising polymer microparticles having a volume average particle diameter of 20 nm to 150 nm and/or a polymer emulsion comprising the microparticles.

13. The composition of claim 3, further comprising polymer microparticles having a volume average particle diameter of 20 nm to 150 nm and/or a polymer emulsion comprising the microparticles.

14. The composition of claim 1, further comprising polymer microparticles having a volume average particle diameter of 20 nm to 150 nm and/or a polymer emulsion comprising the microparticles.

15. The composition of claim 2, wherein the solid solution (b) is present.

* * * * *